United States Patent
Burgett

(10) Patent No.: US 11,724,581 B2
(45) Date of Patent: Aug. 15, 2023

(54) TARGA AND RETRACTABLE VEHICLE TOPS AND RELATED METHODS

(71) Applicant: Big Sky Land Company, LLC, Hamel, IL (US)

(72) Inventor: Seth Burgett, Hamel, IL (US)

(73) Assignee: BIG SKY LAND COMPANY, LLC, Hamel, IL (US)

( * ) Notice: Subject to any disclaimer, the term of this patent is extended or adjusted under 35 U.S.C. 154(b) by 8 days.

(21) Appl. No.: 17/501,722

(22) Filed: Oct. 14, 2021

(65) Prior Publication Data

US 2022/0111712 A1  Apr. 14, 2022

Related U.S. Application Data

(60) Provisional application No. 63/091,855, filed on Oct. 14, 2020.

(51) Int. Cl.
  *B60J 7/12* (2006.01)
  *B60J 1/18* (2006.01)

(52) U.S. Cl.
  CPC .............. *B60J 7/1265* (2013.01); *B60J 1/183* (2013.01); *B60J 7/1291* (2013.01)

(58) Field of Classification Search
  CPC ...... B60J 7/1226; B60J 7/1239; B60J 7/1265; B60J 7/108; B60J 7/1291; B60J 7/00; B60J 7/145; B60J 7/146; B60J 7/12; B60J 1/183
  USPC ............................................ 296/107.01, 108
  See application file for complete search history.

(56) References Cited

U.S. PATENT DOCUMENTS

| 2,697,633 | A | * | 12/1954 | Slason | B60J 7/1265 296/116 |
| 4,850,634 | A | * | 7/1989 | Taubitz | B60J 7/1265 296/121 |
| 5,080,428 | A | * | 1/1992 | Rouland | B60J 7/145 16/382 |
| 5,299,850 | A | * | 4/1994 | Kaneko | B60J 7/1291 296/107.13 |
| 6,068,326 | A | * | 5/2000 | Shiromura | B60J 7/10 296/107.09 |
| 6,206,450 | B1 | * | 3/2001 | Ide | B60J 7/1291 296/217 |
| 6,309,007 | B1 | * | 10/2001 | Essig | B60J 10/00 296/218 |
| 6,431,635 | B2 | * | 8/2002 | Nicastri | B60J 7/1265 296/107.09 |
| 7,523,977 | B2 | * | 4/2009 | Fallis, III | B60J 7/0053 296/107.09 |

(Continued)

FOREIGN PATENT DOCUMENTS

FR  2745778 A1 * 9/1997 ................ B60J 7/08

*Primary Examiner* — Joseph D. Pape
*Assistant Examiner* — Veronica M Shull
(74) *Attorney, Agent, or Firm* — Norton Rose Fulbright US LLP

(57) ABSTRACT

A vehicle top can comprise a targa top and a retractable top. The retractable top can comprise fabric and a frame. The targa top and the retractable top can be configured to be coupled to a vehicle such that the targa top overlies at least one front seat of the vehicle and the retractable top is pivotable between deployed and retracted positions. The fabric of the retractable top can be disposed closer to the targa top and overlie more of the vehicle when the retractable top is in the deployed position than when the retractable top is in the retracted position.

20 Claims, 19 Drawing Sheets

(56) References Cited

U.S. PATENT DOCUMENTS 8,944,486 B2 * 2/2015 Donohoe ................ B60J 11/04
296/136.03

* cited by examiner

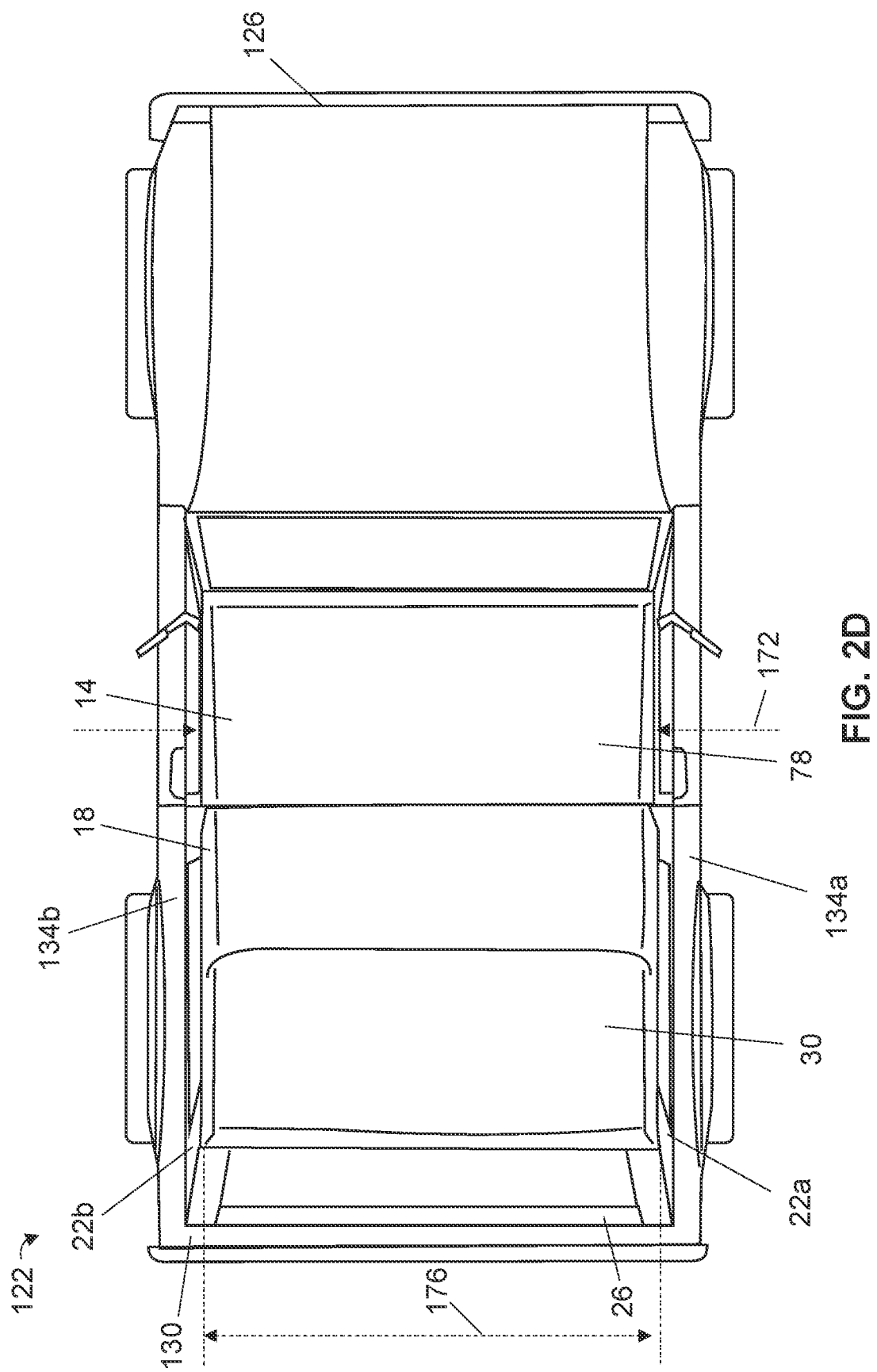

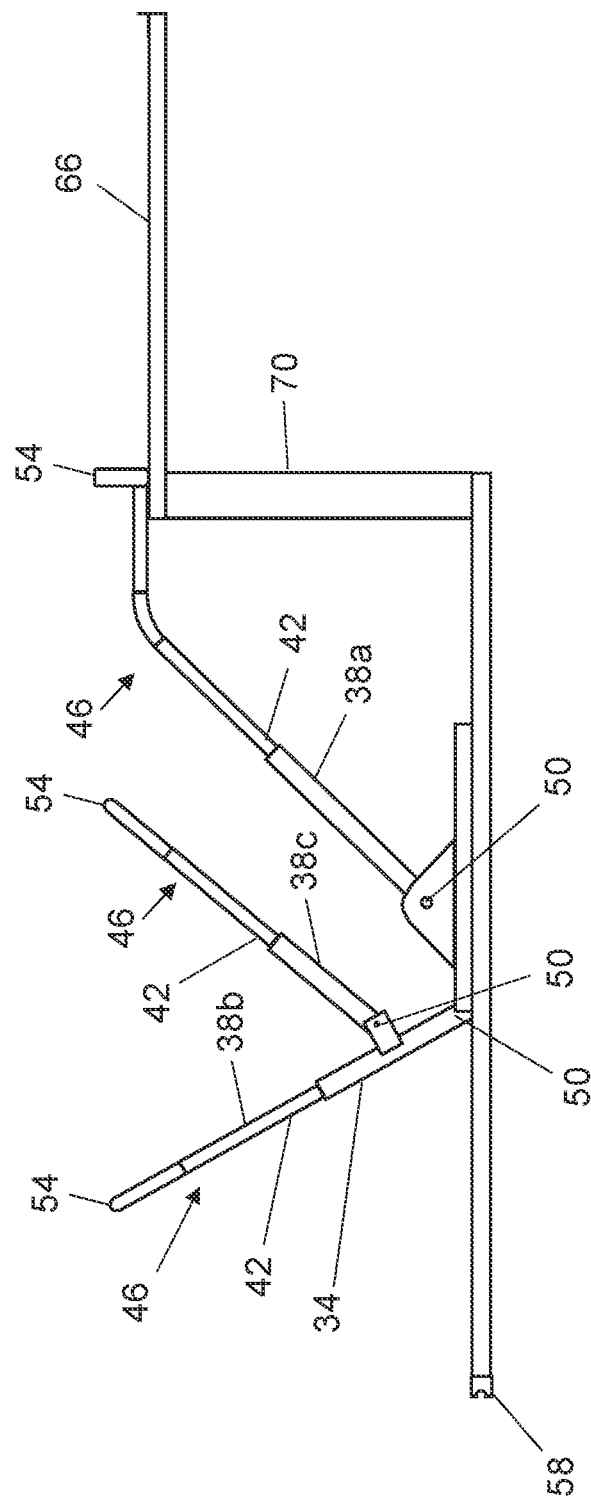

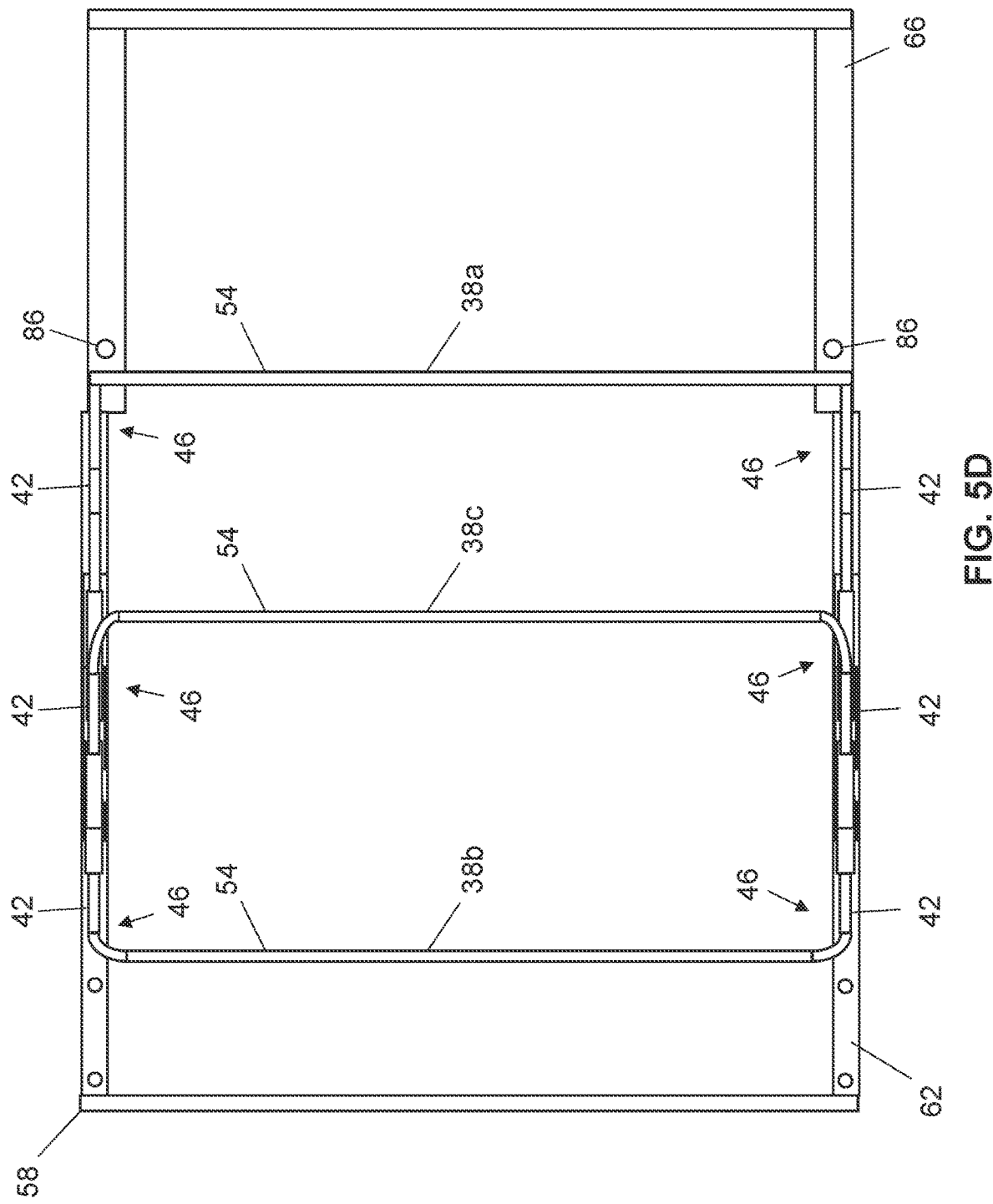

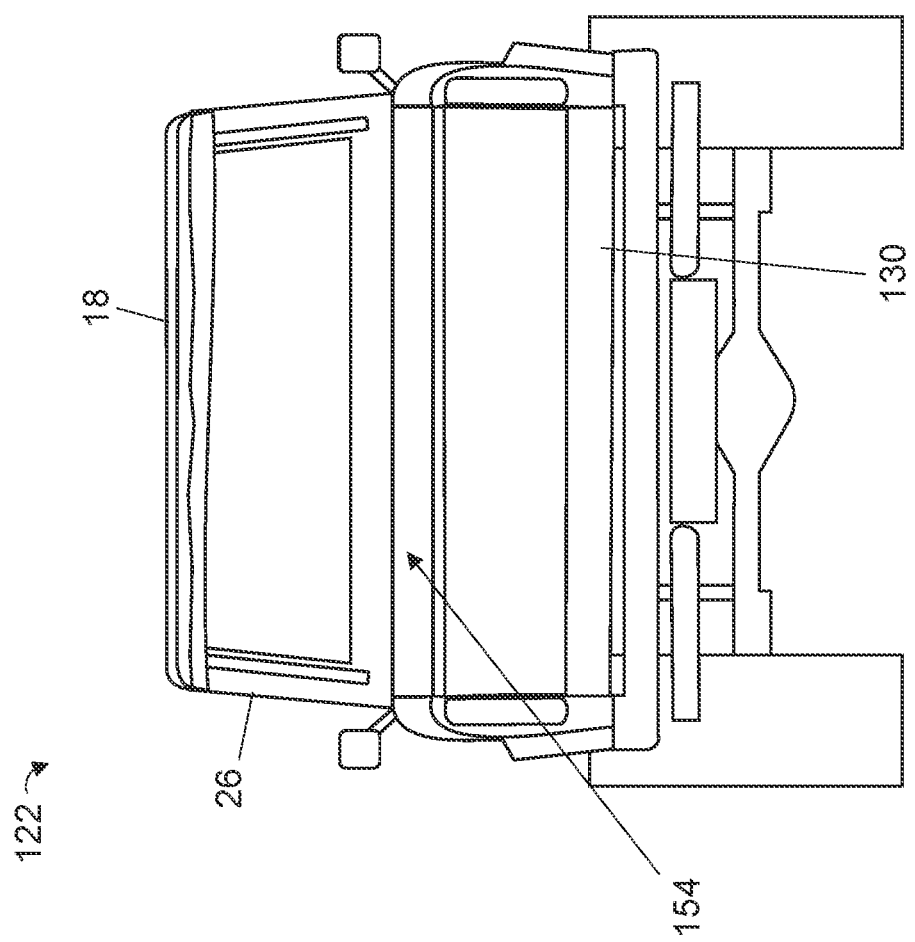

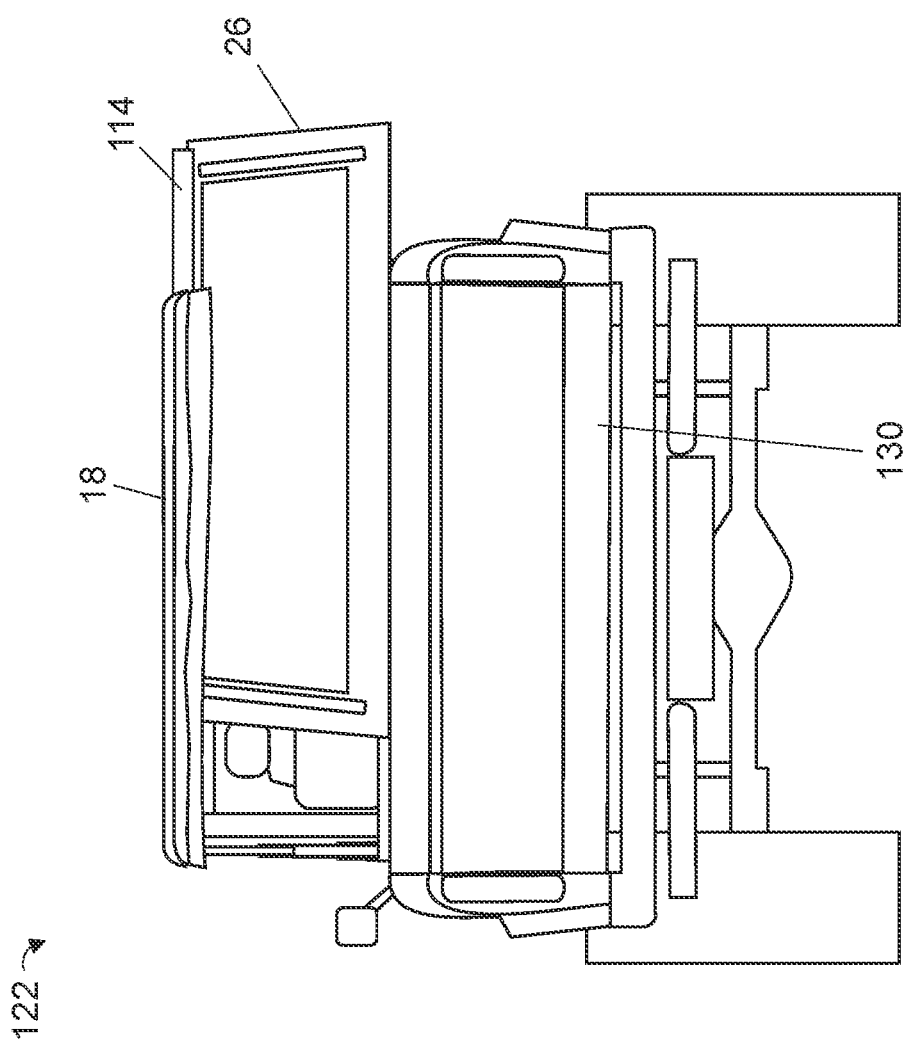

TARGA AND RETRACTABLE VEHICLE TOPS AND RELATED METHODS

CROSS REFERENCE TO RELATED APPLICATIONS

This application claims the benefit of U.S. Provisional Application No. 63/091,855 filed Oct. 14, 2020. The contents of the referenced application are incorporated into the present application by reference.

FIELD OF INVENTION

The present invention relates generally to vehicle tops, and more particularly to vehicle tops that can be removed or retracted to uncover portions of a vehicle underlying the top.

BACKGROUND

Vehicles such as automobiles commonly include a top overlying a passenger compartment thereof. Vehicle tops can promote comfort for passengers by providing protection against wind, sun, precipitation (e.g., rain and snow), and/or the like. However, under desirable weather conditions, passenger enjoyment can be improved by uncovering at least a portion of the passenger compartment. Some vehicles include a top that allows a user to choose to ride with or without the top overlying the passenger compartment such that the top is available for protection in less-than-desirable conditions but can uncover the passenger compartment when desired. For example, some vehicles include a convertible top that is retractable, and others include a targa top that, while not retractable, can be removed from the vehicle to uncover the front seats thereof.

Current convertible and targa tops can pose challenges. For example, when retracted, convertible tops can occupy a substantial amount of cargo space, thereby decreasing the amount of cargo that the vehicle can carry. Additionally, some convertible tops can be difficult to retract and/or deploy. While targa tops can be readily removed, they typically only permit uncovering of the vehicle's front seats. These challenges can be pronounced for larger vehicles such as sport utility vehicles, which typically have multiple rows of seats and thus require a larger top to provide coverage thereof. These larger vehicles thus typically do not include tops that permit uncovering of the passenger compartment thereof, and those that do face the above-described challenges.

SUMMARY

Accordingly, there is a need in the art for a user-friendly vehicle top that can allow the passenger compartment thereof to be uncovered while mitigating losses in cargo space. The present vehicle tops can address this need in the art by including both a targa top and a retractable top that comprises fabric and a frame. The targa top can be removably coupled to a vehicle to overlie at least one front seat thereof, thereby allowing a front portion of the vehicle's passenger compartment to be uncovered. The retractable top can be pivotable between deployed and retracted positions, wherein the retractable top's fabric is disposed closer to the targa top and overlies more of the vehicle when the retractable top is in the deployed position than when it is in the retracted position. A rear portion of the vehicle's passenger compartment can thus be uncovered by moving the retractable top to the retracted position. This configuration can allow the retractable top to have a relatively small form factor when in the retracted position to preserve cargo space and rear visibility for a driver, even when the vehicle is relatively large (e.g., a sport utility vehicle).

To facilitate retraction of the retractable top, the frame can include two or more linkages, each having two arms that each includes an upper portion coupled to the fabric. The arms of first and second ones of the linkages can each include a lower end that can be pivotably coupled to a respective one of opposing sides of the vehicle, with the upper portions of the first linkage's arms coupled to a front portion of the fabric and the upper portions of the second linkage's arms coupled to a rear portion of the fabric. Optionally, the arms of a third one of the linkages can each have a lower end pivotably coupled to a respective one of the arms of the second linkage and an upper portion coupled to a middle portion of the fabric. The retractable top can be pivoted from the deployed position to the retracted position by pivoting the arms of the first linkage (e.g., with one or more motors), which can cause the arms of the second linkage to pivot until they engage a stopping surface. Once the second linkage's arms engage the stopping surface, pivoting of the first linkage's arms can cause the third linkage's arms to pivot relative to the second linkage such that the retractable top folds onto itself. Retraction can be completed when the first linkage's arms engage those of the third linkage. This operation can be straightforward and user-friendly, while allowing the retractable top to have a small form factor.

The vehicle top can also include two side panels and a rear panel removably coupled to the retractable top and the vehicle such that the side panels each extends from the retractable top to a respective one of opposing sides of the vehicle and the rear panel extends from the retractable top to the vehicle's rear. Such side and rear panels can allow the retractable top to be positioned higher above the passenger compartment to yield more headroom for passengers in the rear seats thereof. The side and rear panels can be removed before the retractable top is pivoted to the retracted position.

Some of the present vehicles tops comprise a targa top and a retractable top. The targa top, in some vehicle tops, is configured to be coupled to a vehicle such that the targa top overlies at least one front seat of the vehicle. The retractable top, in some vehicle tops, is configured to be coupled to the vehicle such that the retractable top is pivotable between deployed and retracted positions. Some of the present methods comprise pivoting a retractable top from a deployed position to a retracted position. Some methods comprise removing a targa top that overlies at least one front seat of the vehicle from the vehicle.

In some embodiments, the retractable top comprises fabric and a frame. The fabric of the retractable top, in some embodiments, is disposed closer to the targa top and/or to a front of the vehicle and overlies more of the vehicle when the retractable top is in the deployed position than when the retractable top is in the retracted position. The targa top, in some embodiments, comprises fabric and a frame coupled to the fabric, wherein the frame is configured to be removably coupled to the vehicle such that the fabric overlies at least one front seat of the vehicle. In some embodiments, the targa top comprises one or more latches, each configured to detachably engage the vehicle.

The frame of the retractable top, in some embodiments, includes two or more linkages, optionally three or more linkages. Each of the linkages, in some embodiments, comprises two arms that each includes an upper portion that is coupled to the fabric of the retractable top and is disposed closer to the targa top and/or to the front of the vehicle when the retractable top is in the deployed position than when the retractable top is in the retracted position. In some embodiments, each of the linkages comprises a cross-support that is coupled to the fabric of the retractable top and extends between the upper portions of the arms of the linkage. The linkages, in some embodiments, are sized such that, when the retractable top is in the retracted position, for each of the cross-supports a distance, measured along the length of the vehicle, between the cross-support and each other of the cross-supports is within 10% of the length of the retractable top when in the deployed position.

In some embodiments, for each of first and second ones of the linkages, each of the arms has a lower end that is configured to be pivotably coupled or is pivotably coupled to a respective one of opposing sides of the vehicle. For each of the arms of the first linkage, in some embodiments, the upper portion of the arm is coupled to a front portion of the fabric of the retractable top such that, when the retractable top is in the deployed position, as measured along a length of the vehicle the upper portion of the arm is disposed closer to the targa top and/or to the front of the vehicle than is the lower end of the arm. For each of the arms of the second linkage, in some embodiments, the upper portion of the arm is coupled to a rear portion of the fabric of the retractable top such that, when the retractable top is in the deployed position, as measured along a length of the vehicle the upper portion of the arm is disposed further from the targa top and/or from the front of the vehicle than is the lower end of the arm. In some embodiments, each of the arms of a third one of the linkages has a lower end pivotably coupled to a respective one of the arms of the second linkage. For each of the arms of the third linkage, in some embodiments, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the targa top and/or to the front of the vehicle than is the lower end of the arm.

In some of the present methods, pivoting the retractable top to the retracted position comprises pivoting the arms of the first and second linkages relative to the vehicle. Some vehicle tops comprise, for at least one arm of the first linkage, a motor configured to pivot the arm relative to the vehicle to move the retractable top between the deployed and retracted positions, and in some methods pivoting the retractable top to the retracted position comprises actuating one or more motors such that the motor(s) pivot the arms of the first linkage relative to the vehicle. In some embodiments, pivoting of the arms of the first linkage causes the arms of the second linkage to pivot until engaging a stopping surface disposed further from the targa top and/or from the front of the vehicle than are the lower ends of the arms of the second linkage and, after the arms of the second linkage engage the stopping surface, the arms of the third linkage to pivot relative to the second linkage.

Some of the present vehicle tops comprise a rear panel and two side panels configured to be coupled to the retractable top and the vehicle when the retractable top is in the deployed position such that the rear panel extends between the retractable top and a rear of the vehicle and each of the side panels extends between the retractable top and a respective one of opposing sides of the vehicle. In some vehicle tops, the rear panel and side panels each is configured to be slidably coupled to the retractable top. Each of the side panels, in some vehicle tops, is configured to be coupled to the rear panels. In some of such vehicle tops, each of the side panels comprises a fastening element in a rear portion of the side panel that is configured to engage a fastening element of the rear panel to couple the side panel to the rear panel. Some methods comprise decoupling the side panels and the rear panel from the vehicle and the retractable top before the retractable top is pivoted to the retracted position. In some of such methods, decoupling the rear panel comprises pivoting the retractable top towards the retracted position. The rear panel and the side panels, in some embodiments, each comprises fabric surrounding a transparent material.

Some vehicle tops comprise a mounting frame and includes a targa support, a linkage support, and a riser extending between the targa support and the linkage support. The linkage support, in some vehicle tops, is configured to be fastened to opposing sides of the vehicle such that the targa support is disposed higher and closer to a front of the vehicle than the linkage support. The targa top, in some vehicle tops, is configured to be removably coupled to the targa support. The lower ends of the arms of the first and second linkages, in some vehicle tops, are pivotably coupled to the linkage support.

Some of the present vehicles comprise one of the present vehicle tops. In some vehicles, the targa top is removably coupled to the vehicle such that the targa top overlies at least one front seat of the vehicle. In some vehicles, the retractable top is coupled to the vehicle such that the retractable top is pivotable between the deployed and retracted positions, the fabric of the retractable top disposed closer to the targa top and overlying more of the vehicle when the retractable top is in the deployed position than when the retractable top is in the retracted position.

Also disclosed are aspects 1-20. Aspect is a vehicle top comprising: a targa top; and a retractable top comprising fabric and a frame; wherein the targa top and the retractable top are configured to be coupled to a vehicle such that: the targa top overlies at least one front seat of the vehicle; and the retractable top is pivotable between deployed and retracted positions, the fabric of the retractable top disposed closer to the targa top and overlying more of the vehicle when the retractable top is in the deployed position than when the retractable top is in the retracted position. Aspect 2 is the vehicle top of aspect 1, comprising a rear panel and two side panels configured to be removably coupled to the retractable top and the vehicle when the retractable top is in the deployed position such that: the rear panel extends between the retractable top and a rear of the vehicle; and each of the side panels extends between the retractable top and a respective one of opposing sides of the vehicle. Aspect 3 is the vehicle top of aspect 2, wherein the rear panel and the side panels each comprises fabric surrounding a transparent material. Aspect 4 is the vehicle top of aspect 2 or 3, wherein the rear panel and the side panels each is configured to be slidably coupled to the retractable top. Aspect 5 is the vehicle top of any of aspects 2-4, wherein each of the side panels is configured to be coupled to the rear panel. Aspect 6 is the vehicle top of aspect 5, wherein each of the side panels comprises a fastening element in a rear portion of the side panel that is configured to engage a fastening element of the rear panel to couple the side panel to the rear panel. Aspect 7 is the vehicle top of any of aspects 1-6, wherein: the frame of the retractable top includes two or more linkages, each of the linkages comprising two arms that each has an upper portion that: is coupled to the fabric of the retractable top; and is disposed closer to the targa top when the retractable top is in the deployed position than when the retractable top is in the retracted position; for each of first and second ones of the linkages, each of the arms has a lower end configured to be pivotably coupled to a respective one of opposing sides of the vehicle; for each of the arms of the first linkage, the upper portion of the arm is coupled to a front portion of the fabric of the retractable top such that, when the retractable top is in the deployed position, as measured along a length of the vehicle the upper portion of the arm is disposed closer to the targa top than is the lower end of the arm; and for each of the arms of the second linkage, the upper portion of the arm is coupled to a rear portion of the fabric of the retractable top such that, when the retractable top is in the deployed position, as measured along a length of the vehicle the upper portion of the arm is disposed further from the targa top than is the lower end of the arm. Aspect 8 is the vehicle top of aspect 7, wherein: the two or more linkages comprise three or more linkages; each of the arms of a third one of the linkages has a lower end pivotably coupled to a respective one of the arms of the second linkage; and for each of the arms of the third linkage, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the targa top than is the lower end of the arm. Aspect 9 is the vehicle top of aspect 7 or 8, wherein each of the linkages comprises a cross-support that is coupled to the fabric of the retractable top and extends between the upper portions of the arms of the linkage. Aspect 10 is the vehicle top of aspect 9, wherein the linkages are sized such that, when the retractable top is in the retracted position, for each of the cross-supports a distance, measured along the length of the vehicle, between the cross-support and each other of the cross-supports is within 10% of the length of the retractable top when in the deployed position. Aspect 11 is the vehicle top of any aspects 8-10, comprising: for at least one arm of the first linkage, a motor configured to pivot the arm relative to the vehicle to move the retractable top between the deployed and retracted positions; wherein when the retractable top is pivoted from the deployed position to the retracted position, pivoting of the arms of the first linkage causes: the arms of the second linkage to pivot until engaging a stopping surface disposed further from the targa top than are the lower ends of the arms of the second linkage; and after the arms of the second linkage engage the stopping surface, the arms of the third linkage to pivot relative to the second linkage. Aspect 12 is the vehicle top of any of aspects 7-11, comprising a mounting frame that includes a targa support, a linkage support, and a riser extending between the targa support and the linkage support, wherein: the linkage support is configured to be fastened to opposing sides of the vehicle such that the targa support is disposed higher and closer to a front of the vehicle than the linkage support; the targa top is configured to be removably coupled to the targa support; and the lower ends of the arms of the first and second linkages are pivotably coupled to the linkage support. Aspect 13 is the vehicle top of any of aspects 1-12, wherein the targa top comprises fabric and a frame coupled to the fabric, wherein the frame is configured to be removably coupled to the vehicle such that the fabric overlies at least one front seat of the vehicle. Aspect 14 is the vehicle top of aspect 13, wherein the targa top comprises one or more latches, each configured to detachably engage the vehicle.

Aspect 15 is a vehicle comprising the vehicle top of any of aspects 1-14, wherein: the targa top is removably coupled to the vehicle such that the targa top overlies at least one front seat of the vehicle; and the retractable top is coupled to the vehicle such that the retractable top is pivotable between the deployed and retracted positions, the fabric of the retractable top disposed closer to the targa top and overlying more of the vehicle when the retractable top is in the deployed position than when the retractable top is in the retracted position.

Aspect 16 is a method of retracting a vehicle top, the method comprising: pivoting a retractable top from a deployed position to a retracted position, wherein: the retractable top comprises fabric and a frame; and the fabric is disposed closer to a front of the vehicle and overlies more of the vehicle when the retractable top is in the deployed position than when the retractable top is in the retracted position; and removing a targa top that overlies at least one front seat of the vehicle from the vehicle. Aspect 17 is the method of aspect 16, wherein before the retractable top is pivoted to the retracted position: two side panels each extends between the retractable top and a respective one of opposing sides of the vehicle; a rear panel extends between the retractable top and a rear of the vehicle; and the method comprises decoupling the side panels and the rear panel from the vehicle and the retractable top. Aspect 18 is the method of aspect 17, wherein decoupling the rear panel comprises pivoting the retractable top towards the retracted position. Aspect 19 is the method of any of aspects 16-18, wherein: the frame of the retractable top includes two or more linkages, each of the linkages comprising two arms that each has an upper portion that: is coupled to the fabric of the retractable top; and is disposed closer to the front of the vehicle when the retractable top is in the deployed position than when the retractable top is in the retracted position; for each of first and second ones of the linkages, each of the arms has a lower end that is pivotably coupled to a respective one of opposing sides of the vehicle; for each of the arms of the first linkage, the upper portion of the arm is coupled to a front portion of the fabric of the retractable top such that, when the retractable top is in the deployed position, as measured along a length of the vehicle the upper portion of the arm is disposed closer to the front of the vehicle than is the lower end of the arm; for each of the arms of the second linkage, the upper portion of the arm is coupled to a rear portion of the fabric of the retractable top such that, when the retractable top is in the deployed position, as measured along a length of the vehicle the upper portion of the arm is disposed further from the front of the vehicle than is the lower end of the arm; and pivoting the retractable top to the retracted position comprises pivoting the arms of the first and second linkages relative to the vehicle. Aspect 20 is the method of aspect 19, wherein: the two or more linkages comprise three or more linkages; each of the arms of a third one of the linkages has a lower end pivotably coupled to a respective one of the arms of the second linkage; for each of the arms of the third linkage, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the front of the vehicle than is the lower end of the arm; and pivoting the retractable top to the retracted position comprises actuating one or motors such that the motor(s) pivot the arms of the first linkage relative to the vehicle, wherein pivoting of the arms of the first linkage causes: the arms of the second linkage to pivot until the arms engage a stopping surface disposed further from the front of the vehicle than the lower ends of the arms of the second linkage; and after the arms of the second linkage engage the stopping surface, the arms of the third linkage to pivot relative to the second linkage.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, a product or system that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Each dimension herein provided in an English unit may be translated to the corresponding metric unit by rounding to the nearest millimeter.

Any embodiment of any of the products, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 2B-2D are rear, front, and top views, respectively, of the vehicle of FIG. 2A.

FIG. 5C is a side view of the mounting frame and the frame of the retractable top of the FIG. 1A vehicle top.

FIG. 5D is a top view of the mounting frame and the frame of the retractable top of the FIG. 1A vehicle top.

FIGS. 7A and 7B are rear views of the vehicle of FIG. 6A that illustrate removal of the rear panel of the vehicle top.

DETAILED DESCRIPTION

Figure 1A:
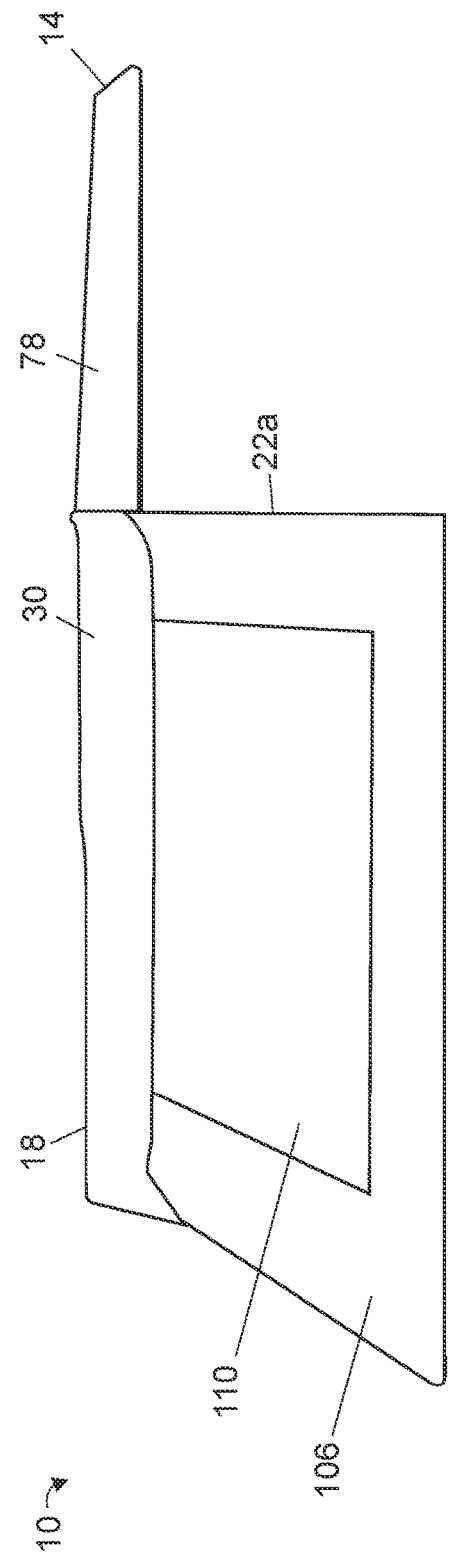
FIG. 1A is a side view of one of the present vehicle tops that includes a targa top, a retractable top, two side panels, and a rear panel.
Figure 1B:
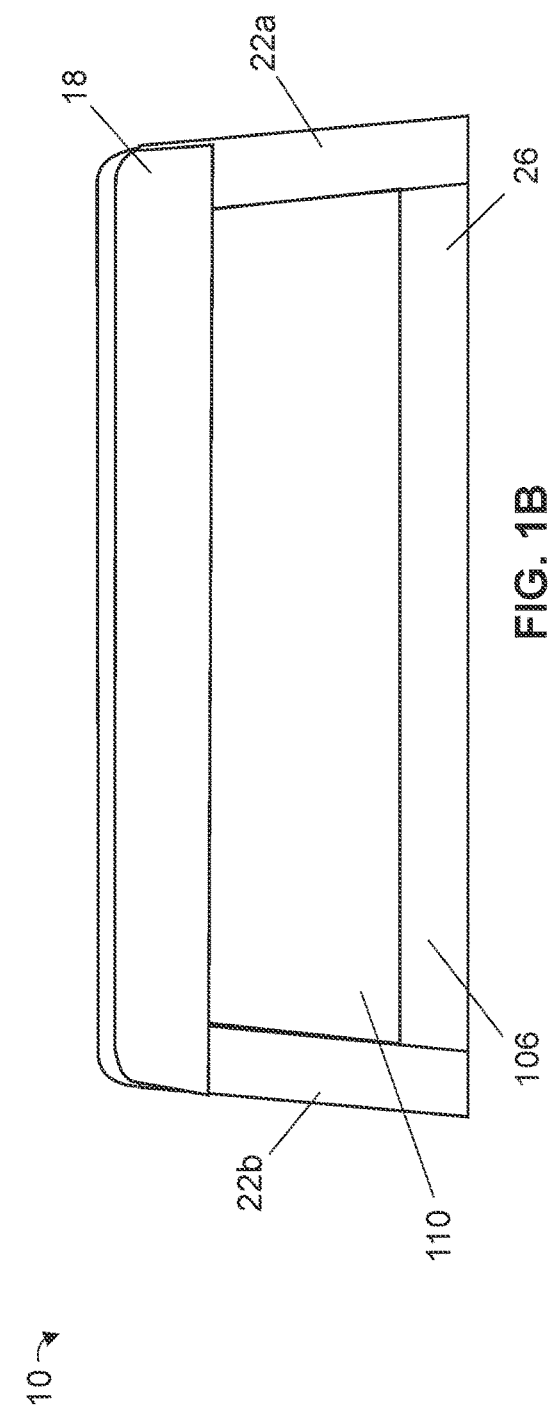
FIG. 1B is a rear view of the vehicle top of FIG. 1A.

Referring to FIGS. 1A and 1B, shown is an embodiment 10 of the present vehicle tops that includes a targa top 14 and a retractable top 18. Vehicle top 10 can also include two side panels 22a and 22b and a rear panel 26, each configured to be removably coupled to retractable top 18 such that the panel extends downwardly therefrom. Referring additionally to FIGS. 2A-2D, top 10 can be coupled to a vehicle 122 (e.g., an automobile) such that targa top 14 and retractable top 18 overlie a passenger compartment of the vehicle, the targa top is disposed closer to the vehicle's front 126 than is the retractable top, each side panel 22a and 22b extends between the retractable top and a respective one of opposing sides 134a and 134b of the vehicle, and rear panel 26 extends between the retractable top and the vehicle's rear 130.

Figure 3:
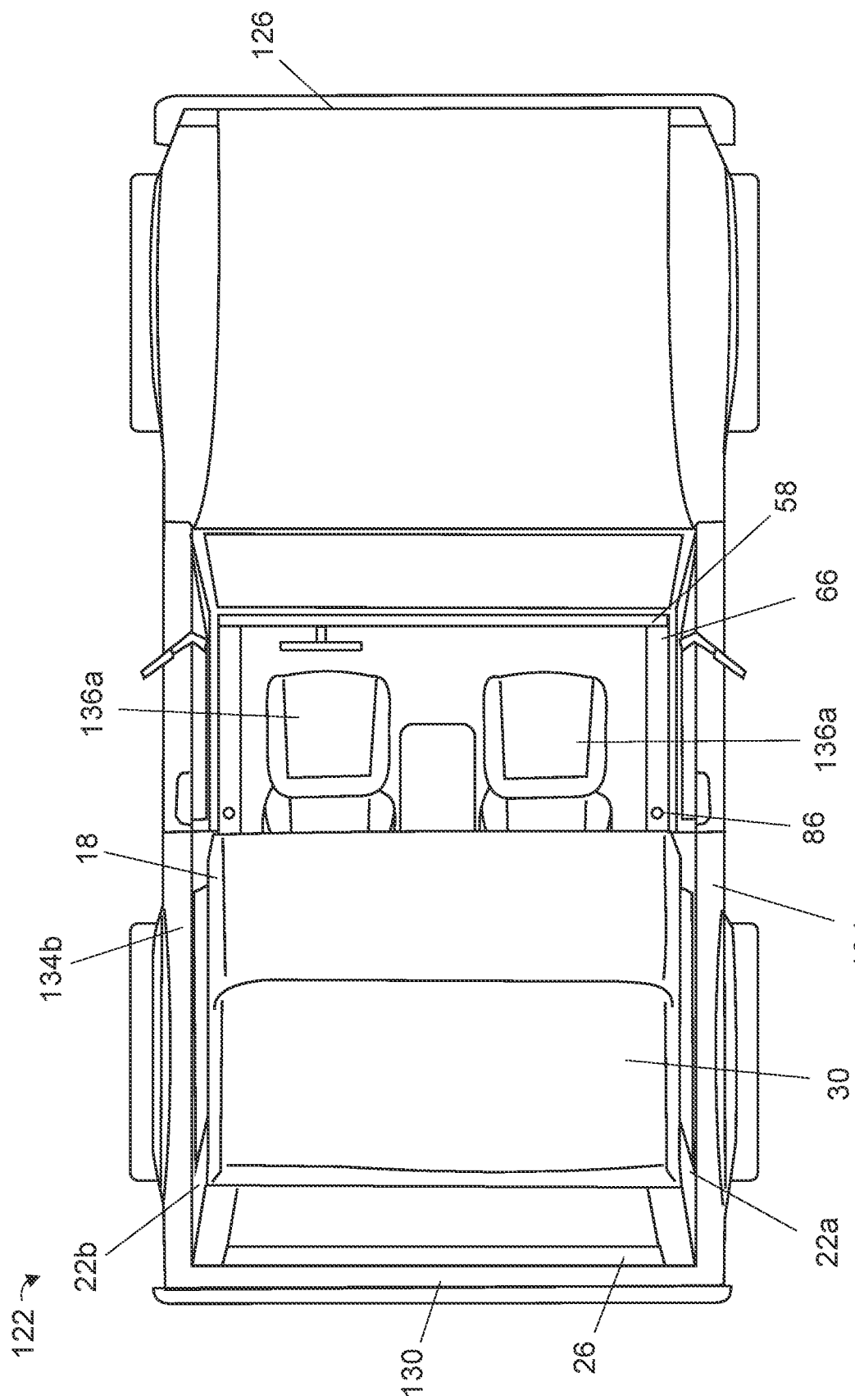
FIG. 3 is a top view of the vehicle of FIG. 2A with the targa top removed.

Targa top 14 and retractable top 18 can each be configured to independently allow exposure of a portion of vehicle 122's passenger compartment. As shown in FIG. 3, targa top 14 can be removably coupled to vehicle 122 such that it overlies at least one—optionally at least two—front seats 136a of the vehicle, thereby allowing a front portion of the vehicle's passenger compartment to be exposed when the targa top is removed. To cover this portion of vehicle 122, targa top 14 can overlie greater than or equal to any one of, or between any two of, 10%, 13%, 16%, 19%, 22%, or 25% of vehicle 122's planform, with the targa top spanning a length 170 that is greater than or equal to any one of, or between any two of, 13%, 16%, 19%, 22%, 25%, or 28% the vehicle's length (e.g. measured in a direction between the vehicle's front and rear ends 126 and 130) and a width 172 that is greater than or equal to any one of, or between any two of, 60%, 63%, 66%, 69%, 72%, 75%, 78%, or 81% of the vehicle's width (e.g., measured in a direction perpendicular to the length). To illustrate, when vehicle 122 is a sport utility vehicle, targa top 14 can have a relatively large length 170 and width 172, such as a length that is greater than or equal to any one of, or between any two of, 22, 24, 26, 28, 30, 32, 34, or 36 inches (e.g., at least 26 inches) and a width that is greater than or equal to any one of, or between any two of, 44, 48, 52, 56, 60, 64, or 68 inches (e.g., at least 50 inches).

Figure 4A:
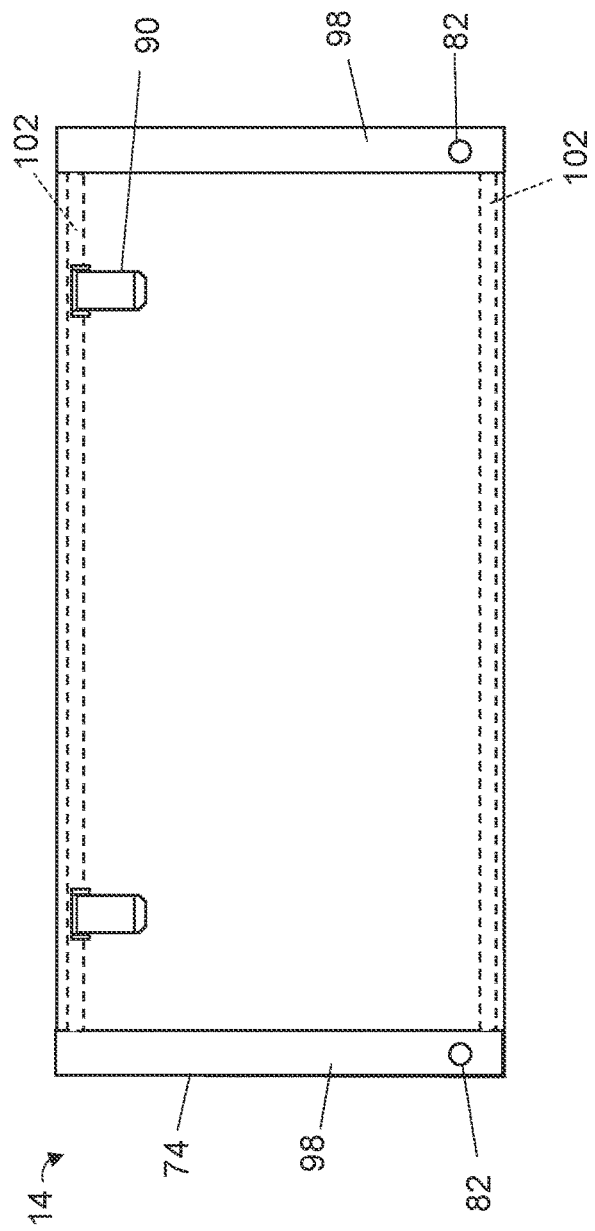
FIG. 4A is a bottom view of the targa top of the FIG. 1A vehicle top.
Figure 4C:
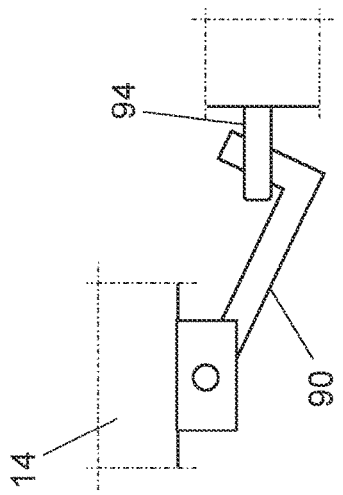
FIG. 4C illustrates a latch by which the targa top can be removably coupled to a vehicle.
Figure 4B:
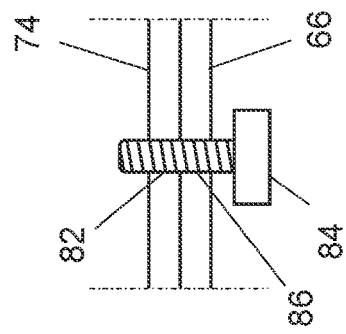
FIG. 4B illustrates a bolt by which the targa top can be removably coupled to the mounting frame of the FIG. 1A vehicle top.
Figure 5A:
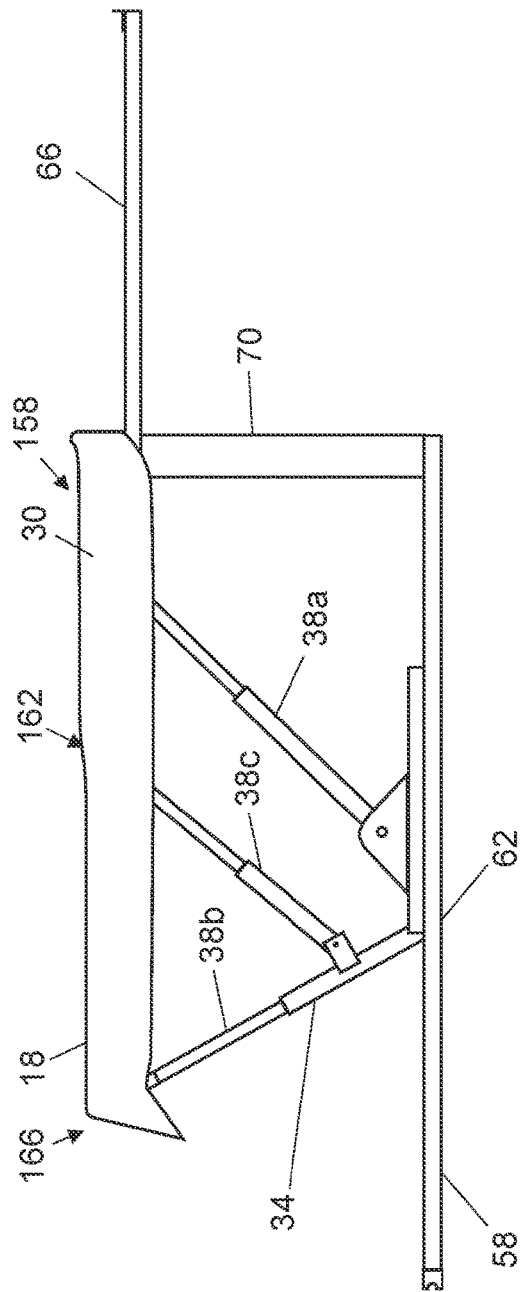
FIG. 5A is a side view of the vehicle top of FIG. 1A with the side panels, rear panel, and targa top removed.
Figure 5B:
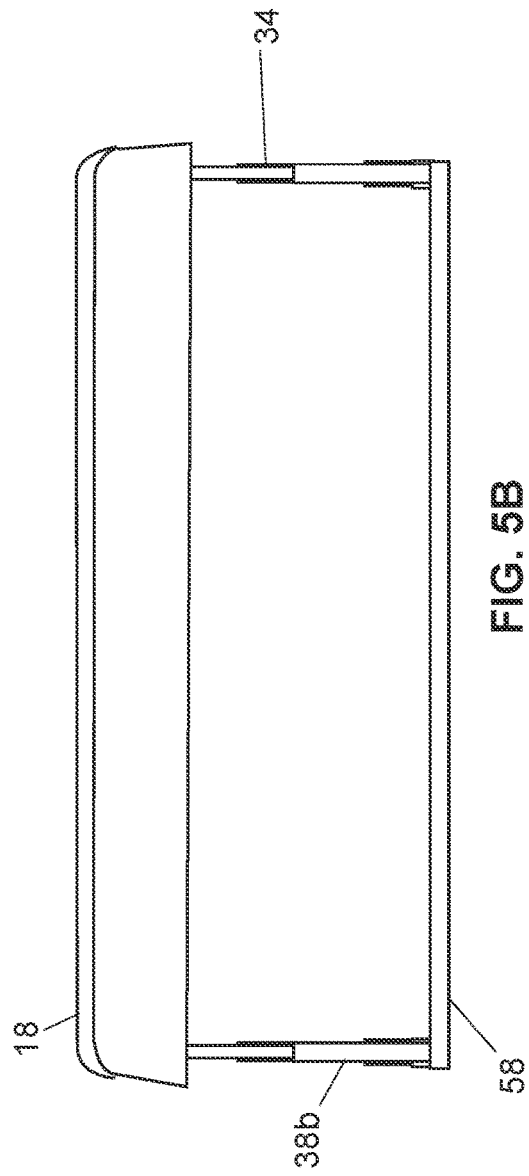
FIG. 5B is a rear view of the vehicle top of FIG. 1A with the side panels, rear panel, and targa top removed.
Figure 6A:
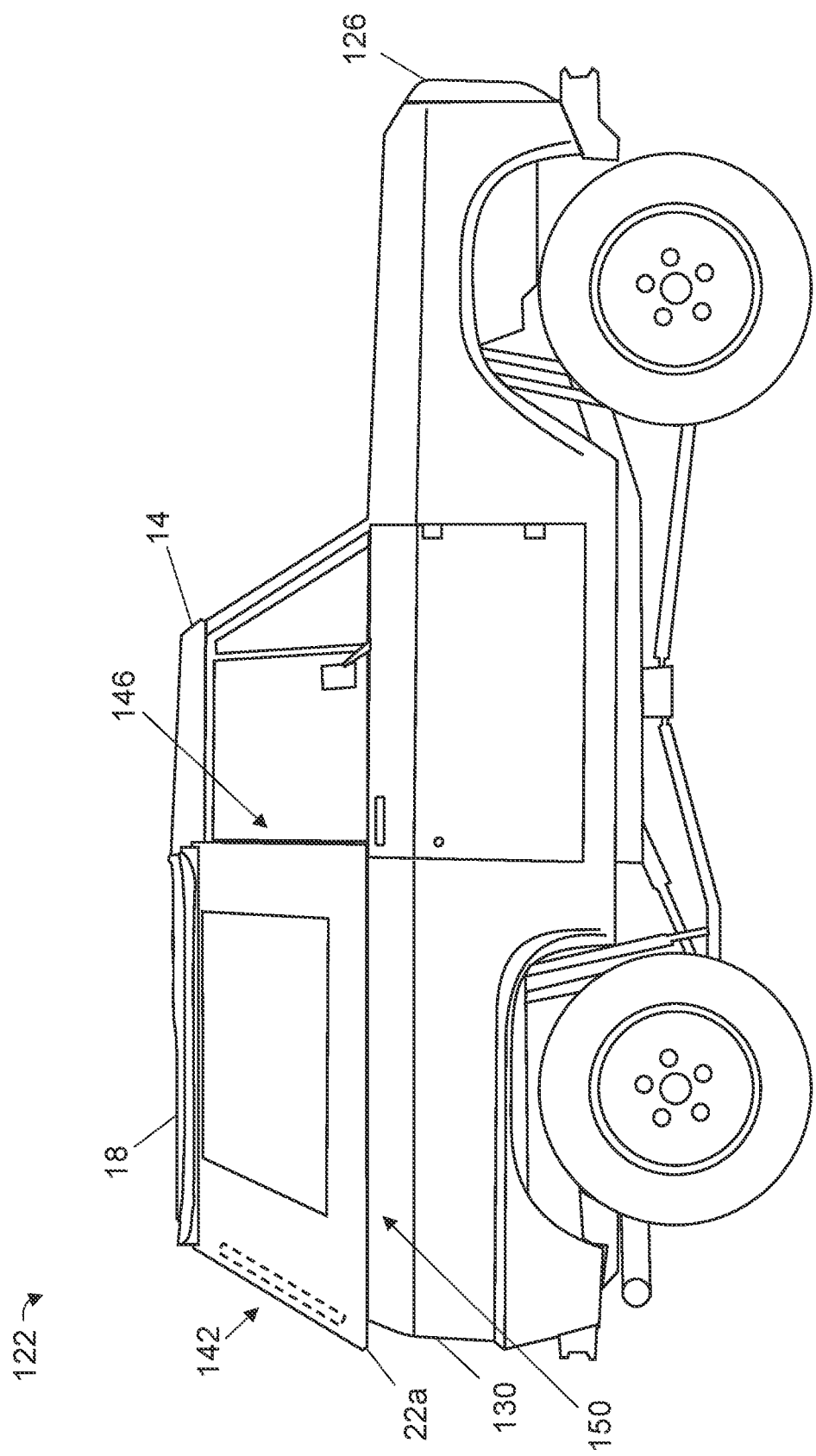
FIGS. 6A and 6B are side views of the vehicle of FIG. 6A that illustrate removal of one of the side panels of the vehicle top.
Figure 6B:
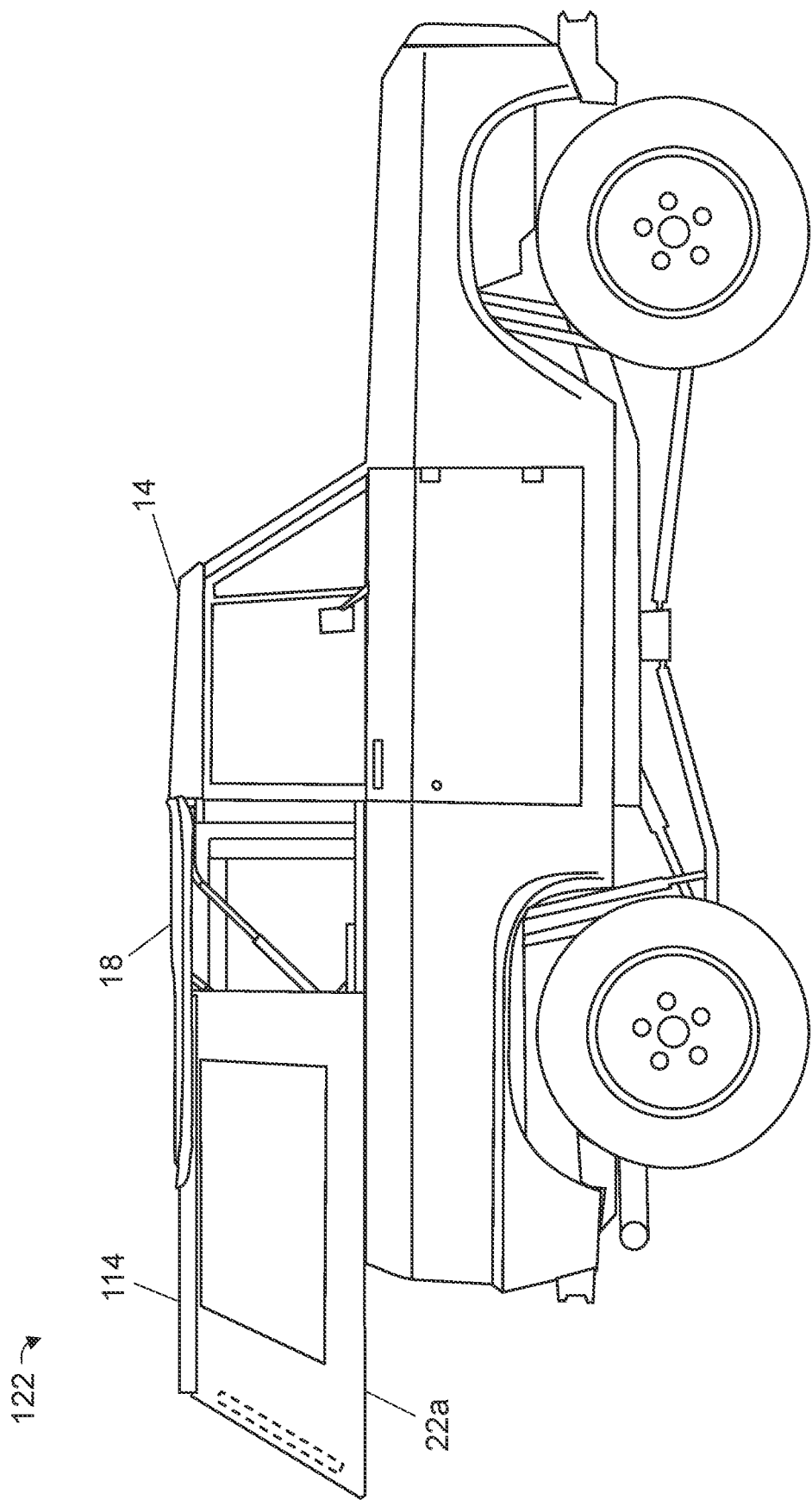

Targa top 14 can be removably coupled to vehicle 122 in any suitable manner, such as via one or more straps, bolts, latches, and/or the like. For example, vehicle top 10 can include a mounting frame 58 that can be fastened to vehicle 122 and include a targa support 66 to which targa top 14 can be removably coupled. Referring additionally to FIGS. 4A and 4B, targa top 14 and mounting frame 58's targa support 66 can each include one or more—optionally two or more—openings 82 and 86, where each of the targa top's opening(s) is positioned to align with a respective one of the targa support's opening(s) when the targa top is disposed on the targa support. A bolt 84 can thereby pass through each pair of openings 82 and 86 to maintain the targa top and targa support together (FIG. 4B). As shown in FIG. 4C, targa top 14 can also include one or more—optionally two or more—latches 90, each configured to detachably engage the vehicle. Each latch 90, for example, can be received by a receptacle 94 of the vehicle or targa support 66 to attach targa support 14 to the vehicle. Targa top 14 can be removed from a vehicle by removing bolt(s) 84 and/or detaching latch(es) 90 from receptacle(s) 94.

Targa top 14 can have any suitable structure to protect passengers from the elements (e.g., wind, precipitation, sun, and/or the like) when coupled to vehicle 122. For example, targa top 14 can comprise a frame 74 and a liquid-repellant fabric 78 coupled to the frame (e.g., to define an outer surface of the targa top). Frame 74 can comprise a side rail 98 extending along each side of targa top 14 and one or more—optionally two or more—cross-supports 102 extending between the side rails, the side rails and cross-support(s) each comprising a material that can provide rigid support, such as a metal (e.g., steel and/or aluminum). Fabric 78 can comprise, for example, a vinyl or a canvas comprising acrylic, butyl rubber, and/or cotton. With its frame-and-fabric structure, targa top 14 can resist deformations that change its planform (e.g., the targa top cannot be folded) and can be relatively lightweight, which can facilitate removal thereof. In other embodiments, however, targa top 14 need not comprise a fabric and/or can be flexible (e.g., to permit folding and/or rolling of the targa top).

Figure 2A:
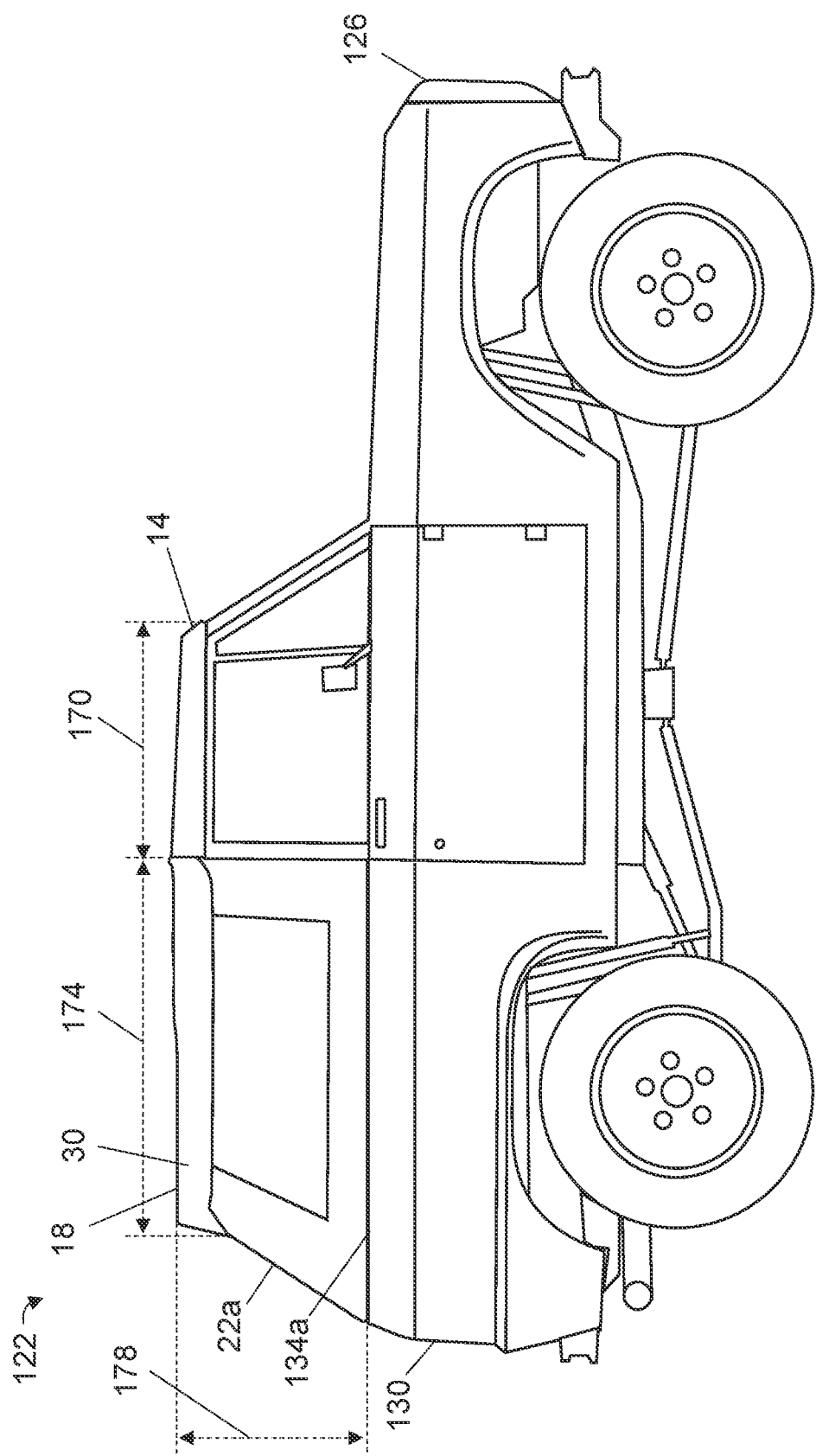
FIG. 2A is a side view of a vehicle with the vehicle top of FIG. 1A attached thereto such that the targa top overlies the front seats of the vehicle and the retractable top is in a deployed position in which it overlies the rear seats of the vehicle.
Figure 2C:
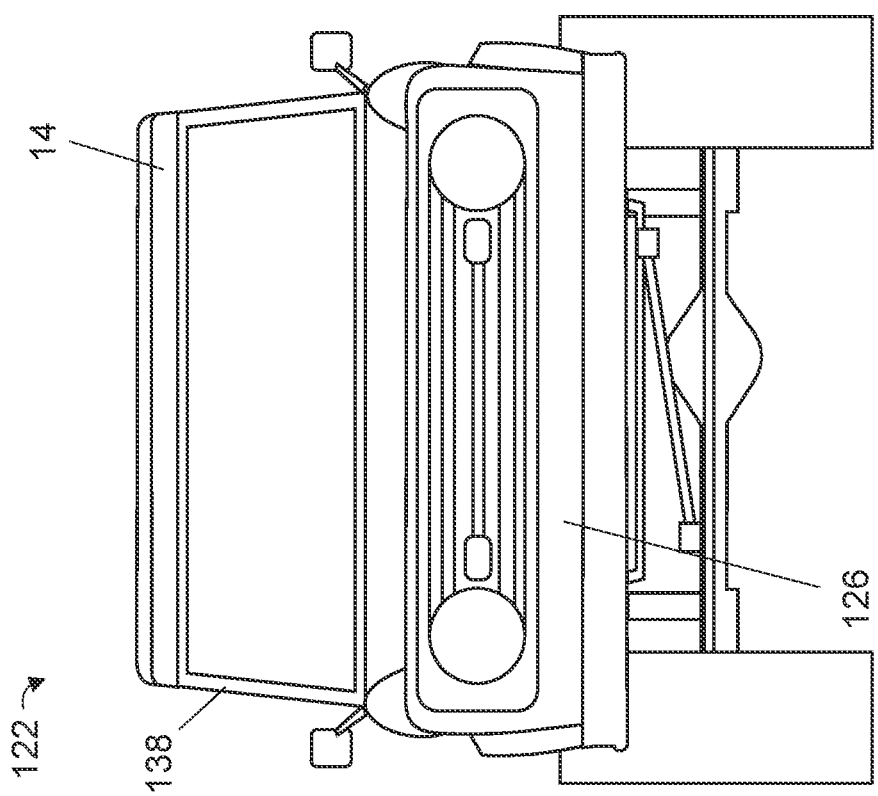
Figure 2B:
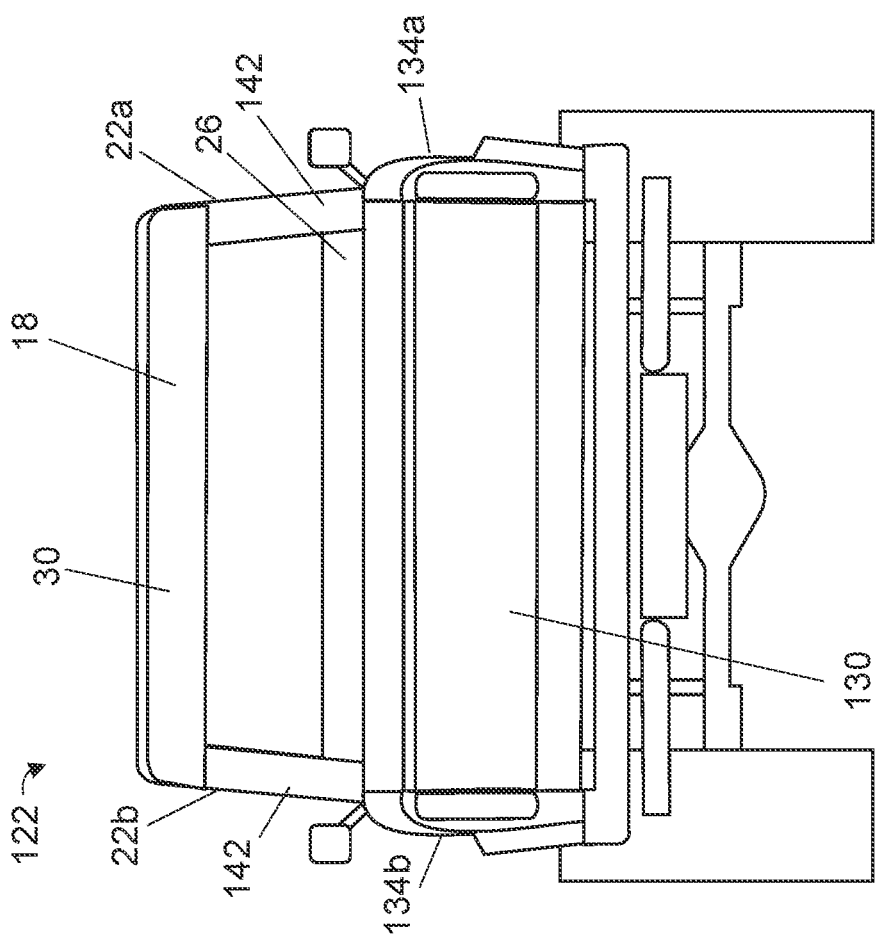

Retractable top 18 can comprise a fabric 30 and be pivotable between retracted and deployed positions such that when the retractable top is in the deployed position (e.g., as shown in FIGS. 1A and 2A), the fabric is disposed closer to targa top 14 and vehicle 122's front 126 and overlies more of the vehicle than when in the retracted position. For example, when deployed, retractable top 18's fabric 30 can cover a rear portion of vehicle 122's passenger compartment. To provide such coverage, fabric 30 can overlie greater than or equal to any one of, or between any two of, 15%, 18%, 21%, 24%, 27%, 30%, or 33% of vehicle 122's planform, with the fabric spanning a length 174 that is greater than or equal to any one of, or between any two of, 18%, 21%, 24%, 27%, 30%, 33%, or 36% of the vehicle's length (e.g., measured in a direction between the vehicle's front and rear ends 126 and 130) and a width 176 that is greater than or equal to any one of, or between any two of, 60%, 63%, 66%, 69%, 72%, 75%, 78%, or 81% of the vehicle's width (e.g., measured in a direction perpendicular to the length). To illustrate, when vehicle 122 is a sport utility vehicle, fabric 30 can have a relatively large length 174 and width 176, such as a length that is greater than or equal to any one of, or between any two of, 40, 44, 48, 52, 56, 60, or 64 inches (e.g., at least 48 inches) and a width that is greater than or equal to any one of, or between any two of, 44, 48, 52, 56, 60, 64, or 68 inches (e.g., at least 50 inches). Additionally, a height 178 between a top of fabric 30 and each of vehicle 122's opposing sides 134a and 134b can be greater than or equal to any one of, or between any two of, 16, 17, 18, 19, 20, 21, 22, 23, or 24 inches to provide adequate headroom for passengers seated in a rear portion of the vehicle's passenger compartment.

Retractable top 18 can be structured to provide protection against the elements (e.g., wind, precipitation, sun, and/or the like) when deployed while permitting retraction thereof. To do so, and referring additionally to FIGS. 5A-5D, fabric 30—which can comprise the same material as targa top 14's fabric 78—can be coupled to a frame 34 that comprises two or more-optionally three or more-linkages 38a-38c. Each of linkages 38a-38c can have two arms 42 that each includes an upper portion 46 coupled to fabric 30. As shown, frame 34 has at least first and second linkages 38a and 38b, where upper portions 46 of the first linkage's arms 42 are coupled to a front portion 158 of fabric 30 and the upper portions of the second linkage's arms are coupled to a rear portion 166 of the fabric such that the frame provides support at the front and rear of retractable top 18. Frame 34 can also include a third linkage 38c whose upper portions 46 of arms 42 are coupled to a middle portion 162 of fabric 30 that is disposed between front and rear portions 158 and 166 to provide support in the middle of retractable top 18. Furthermore, each of linkages 38a-38c can comprise a cross-support 54 that is coupled to fabric 30 and extends between upper portions 46 of the linkage's arms 42 to support the fabric along its width. Arms 42 and cross-supports 54 can each comprise any suitable material to support fabric 30, such as metal (e.g., aluminum and/or steel).

To permit retraction of retractable top 18, for each of first and second linkages 38a and 38b, each of arms 42 can have a lower end 50 that can be pivotably coupled to a respective one of vehicle 122's opposing sides 134a and 134b. Such vehicle attachment can be achieved via a linkage support 62 of mounting frame 58 that can be fastened to vehicle 122's sides 134a and 134b; lower ends 50 of arms 42 of first and second linkages 38a and 38b can be pivotably coupled to the linkage support. Additionally, arms 42 of third linkage 38c can each have a lower end 50 pivotably coupled to a respective one of the arms of second linkage 38b. This can allow retractable top 18 to be pivoted between the deployed and retracted positions.

As mentioned above, when retractable top 18 is in the deployed position, its fabric 30 can be disposed closer to targa top 14—and thus to targa support 66 and vehicle 122's front 126—than when in the retracted position. For example, retractable top 18 can engage targa top 14 when deployed, such as to form a seal to prevent fluid ingress through the interface therebtween. To permit this, a riser 70 can extend between linkage support 62 and targa support 66 such that the targa support (and thus targa top 14) is higher than the linkage support and lower ends 50 of arms 42 of first and second linkages 38a and 38. For each of arms 42 of first linkage 38*a* and/or of third linkage 38*c*, the arm can extend toward targa top 14 and targa support 66 such that, as measured along vehicle 122's length, upper portion 46 of the arm is positioned closer to the targa top, targa support, and the vehicle's front 126 than is lower end 50 of the arm, thereby allowing front portion 158 of fabric 30 to be positioned near the targa top (e.g., within a distance that is less than or equal to 10%, 8%, 6%, 4%, or 2% of the fabric's length 174). By contrast, each of arms 42 of second linkage 38*b* can extend away from targa top 14 and targa support 66 such that, as measured along vehicle 122's length, upper portion 46 of the arm is positioned further from the targa top, targa support, and the vehicle's front 126 than is lower end 50 of the arm.

Figure 8A:
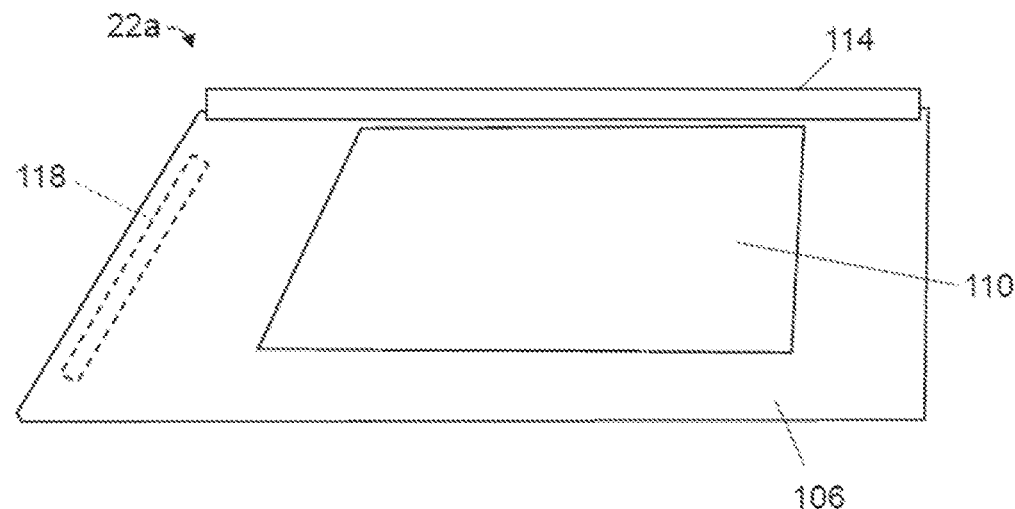
FIGS. 8A and 8B are side views of the side panels of the FIG. 1A vehicle top.
Figure 8B:
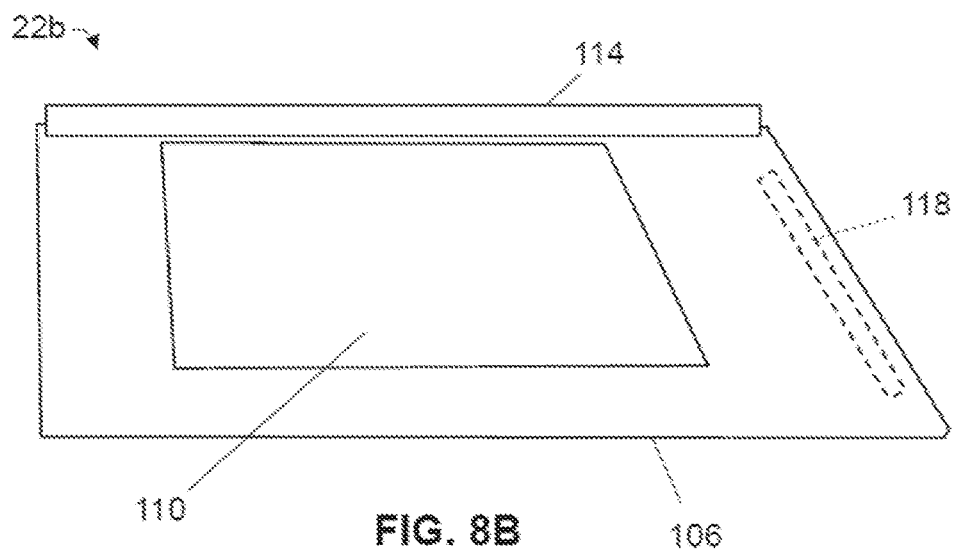
Figure 8C:
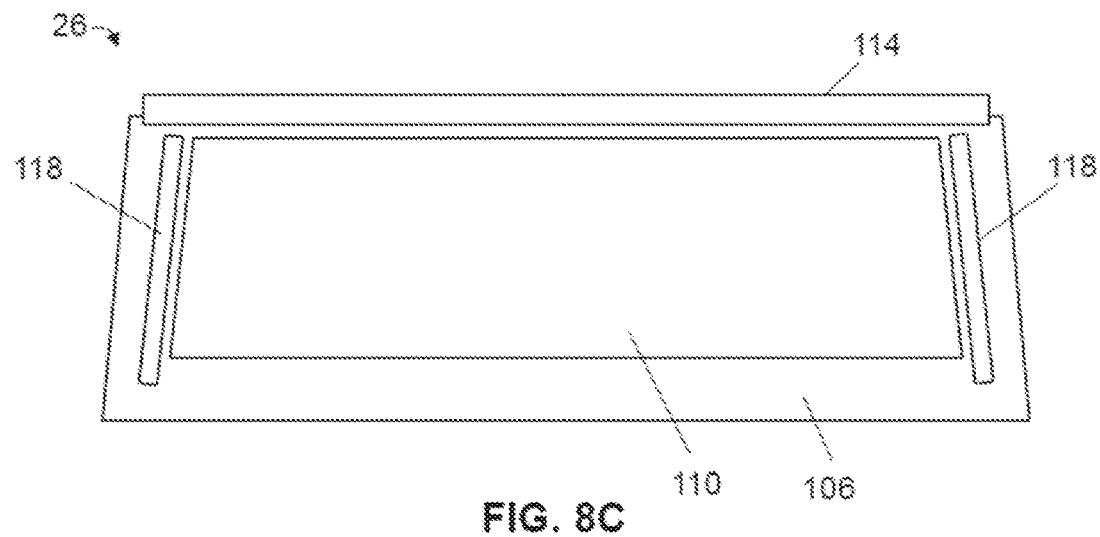
FIG. 8C is a rear view of the rear panel of the FIG. 1A vehicle top.

Referring additionally to FIGS. 6A-6B and FIGS. 7A-7B, to facilitate pivoting of retractable top 18 to its retracted position, side panels 22*a* and 22*b* and rear panel 26 can be removed before retraction thereof. This can be achieved in any suitable manner; as shown, each of side panels 22*a* and 22*b* and rear panel 26 can be slidably coupled to the retractable top such that each can be slid relative to the retractable top for removal. The coupling of side panels 22*a* and 22*b* and rear panel 26 to retractable top 18 and vehicle 122 can facilitate such removal. As shown in FIGS. 8A-8C, each of side panels 22*a* and 22*b* and rear panel 26 can include a rail 114 configured to slidably engage retractable top 18 (e.g., with a receptacle of the retractable top). Additionally, each of side panels 22*a* and 22*b* can have front and bottom portions 146 and 150 and rear panel 26 can have a bottom portion 154, each configured to detachably engage vehicle 122 (e.g., by being tucked into a rail). Side panels 22*a* and 22*b* and rear panel 26 can each include at least one fastening element 118, such as a hook-and-loop fastener component, a magnet, one or more snap fastener components, and/or a zipper component, such that each of the side panels can be removably coupled to the rear panel. As shown, each of side panels 22*a* and 22*b* can include a fastening element 118 on a rear portion 142 thereof, the rear portion being foldable such that its fastening element can engage with one of rear panel 26's fastening element(s). In this manner, side panels 22*a* and 22*b* and rear panel 26 can be secure when coupled to retractable top 18 and vehicle 122 and can be readily removed therefrom (e.g., by disengaging the connections at rear, front, and bottom portions 142, 146, and 150 of each of side panels 22*a* and 22*b* and at bottom portion 154 of rear panel 26, then sliding each of the panels off of the retractable top). The construction of side panels 22*a* and 22*b* and rear panel 26 can facilitate this removable coupling and storage thereof after removal; for example, each can comprise a flexible fabric 106—which can be the same material as that of retractable top 18's fabric 30—surrounding a transparent material 110—such as a flexible polymer (e.g., polyvinyl chloride)—that can define a window.

Figure 9A:
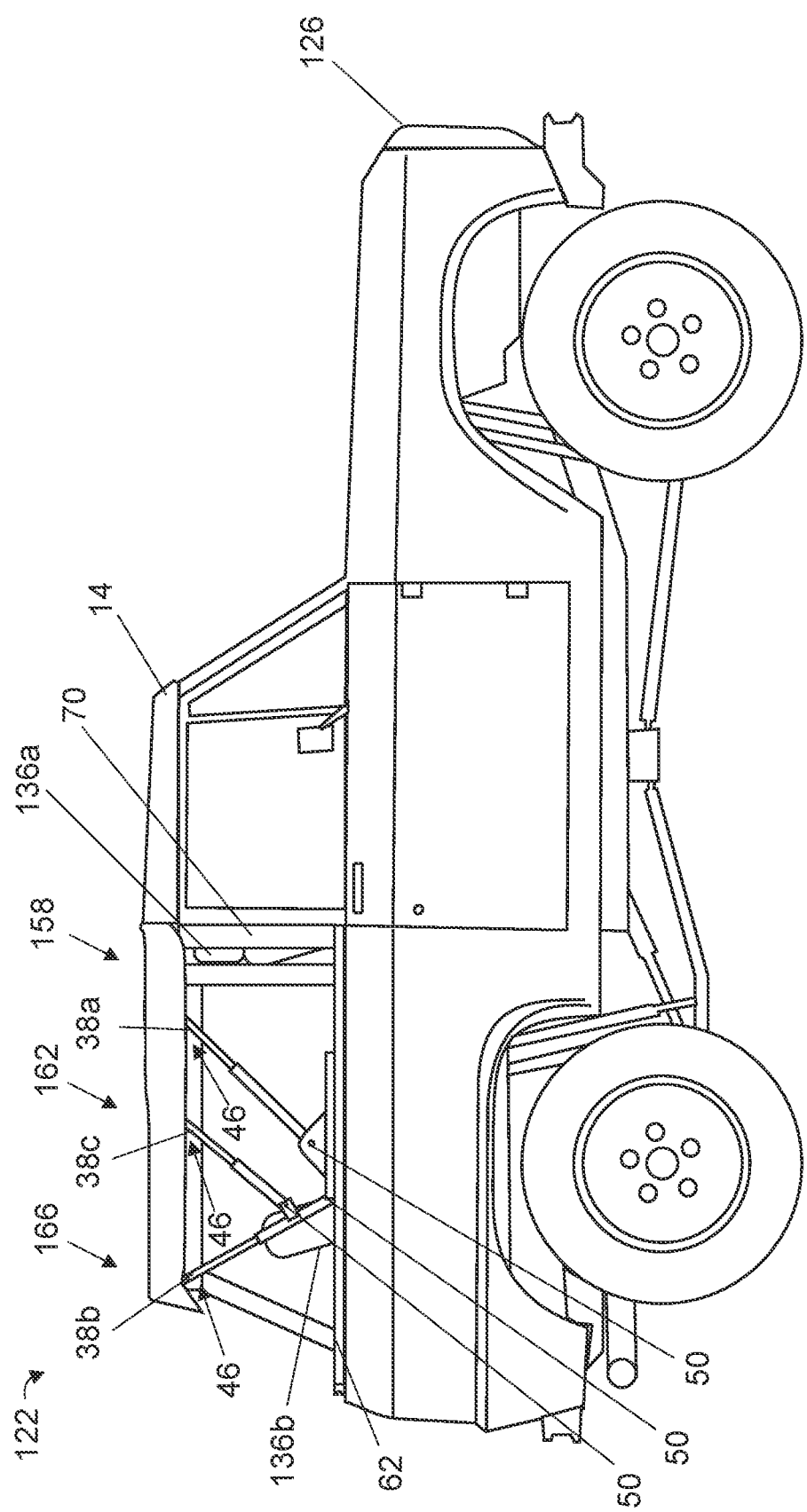
FIG. 9A is a side view of the vehicle of FIG. 2A with the side panels and rear panel removed.
Figure 9B:
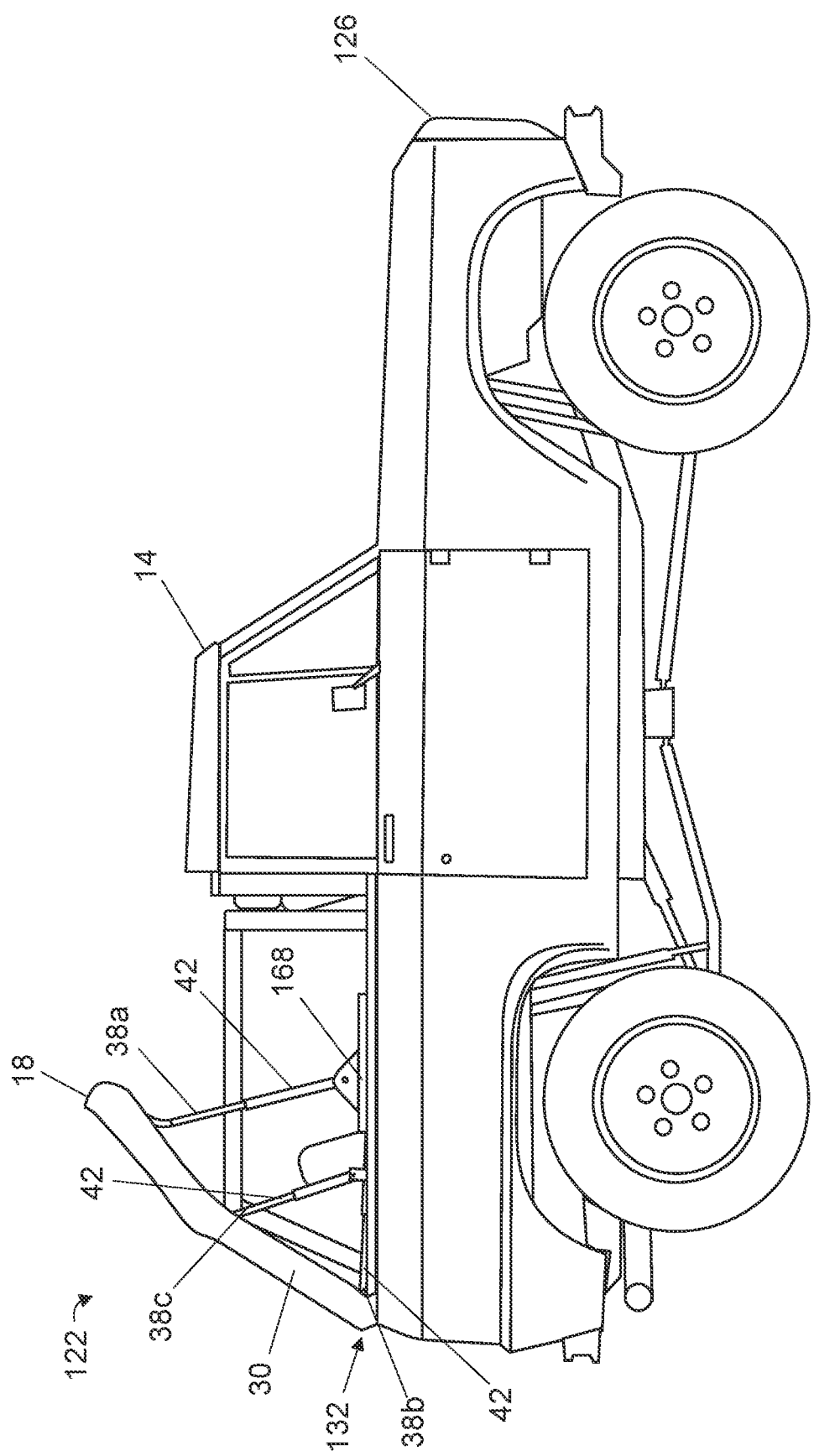
FIGS. 9B-9D are side views of the vehicle of FIG. 2A and illustrates pivoting of the retractable top from the deployed position to the retracted position.
Figure 9C:
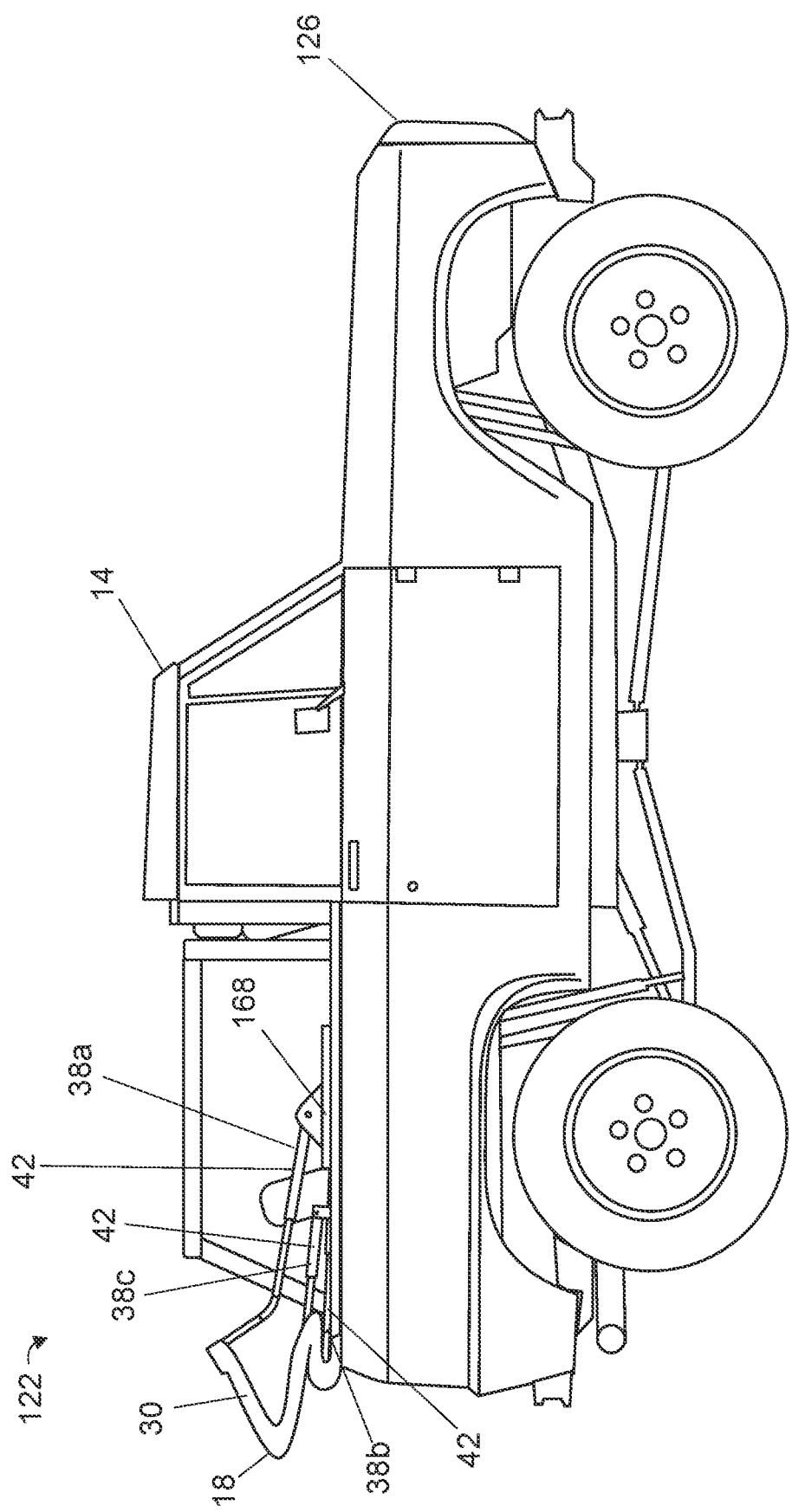
Figure 9D:
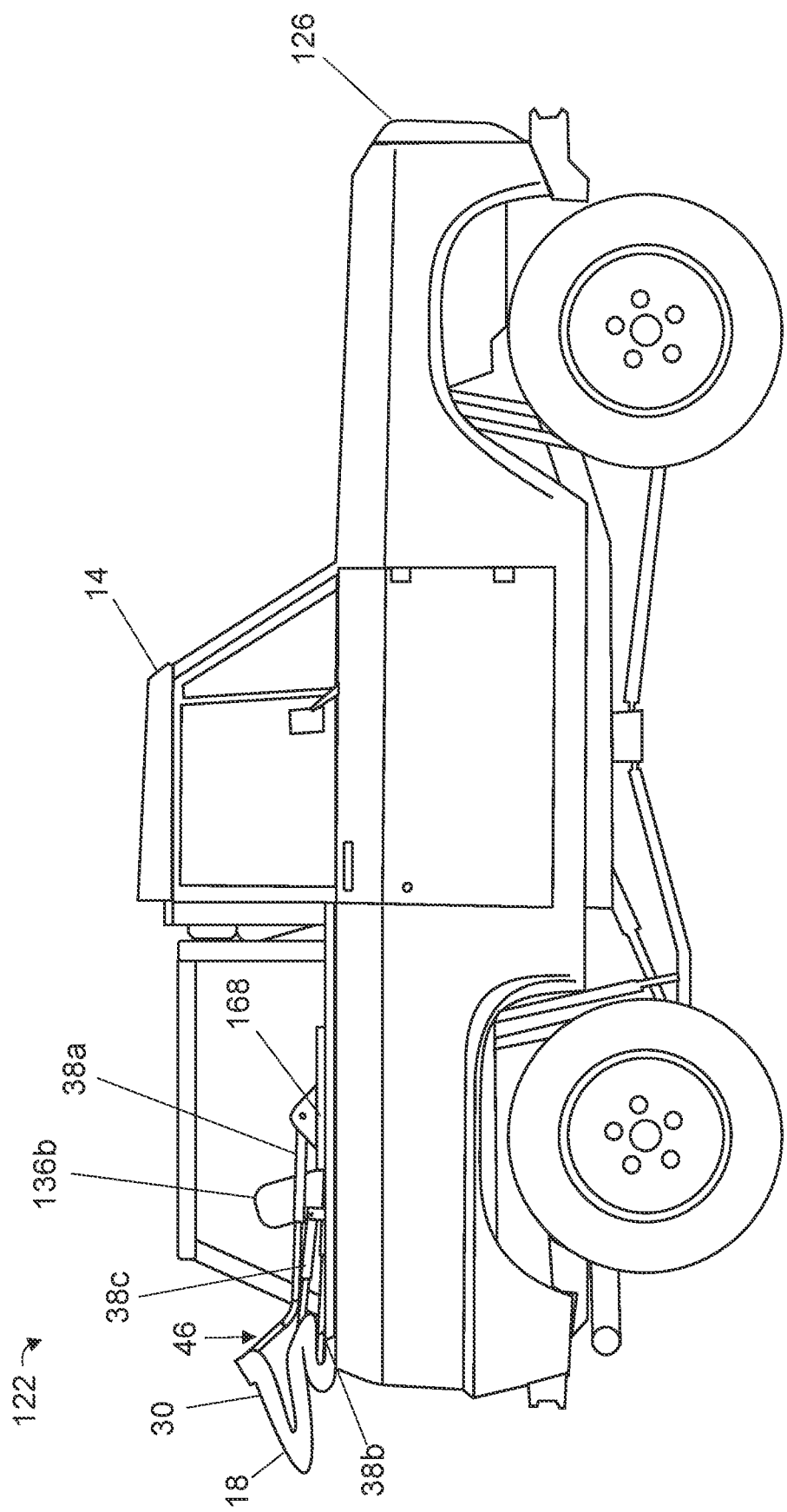

Referring additionally to FIGS. 9A-9D, with side panels 22*a* and 22*b* and rear panel 26 removed (FIG. 9A), retractable top 18 can be pivoted to its retracted position (FIG. 9D). When retractable top 18 is in the retracted position, for each arm 42 of each linkage 38*a*-38*c*, upper portion 46 of the arm can be disposed further from targa top 14, targa support 66, and vehicle 122's front 126 than when the retractable top is in the deployed position (e.g., such that the upper portion of the arm is disposed further from the targa top, targa support, and vehicle's front than is the arm's lower end). Fabric 30 of retractable top 18 can thereby be retracted away from targa top 14, uncovering a rear portion of vehicle 122's passenger compartment (e.g., such that at least one rear seat 136*b* of the vehicle is uncovered). The above-described positioning of linkages 38*a*-38*c*, along with the flexibility of fabric 30, can allow retractable top 18 to have a relatively small form factor when in the retracted position, thereby promoting rear visibility for a driver and mitigating losses in cargo space attributable to the retractable top. For example, as measured along vehicle 122's length, for each of linkages 38*a*-38*c*, a distance between the linkage's cross-support 54 and each other of the cross-supports can be within 10%, 8%, 6%, 4%, or 2% of retractable top 18's length 174 when deployed, optionally such that a distance between the cross-support and vehicle 122's rear 130 is within 10%, 8%, 6%, 4%, or 2% of length 174.

As shown, retractable top 18 can be pivoted by pivoting arms 42 of first linkage 38*a*. Doing so can cause arms 42 of second linkage 38*b* to pivot relative to vehicle 122 (e.g., from a force transmitted through retractable top 18's fabric 30), wherein when the retractable top moves from the deployed position to the retracted position, the second linkage's arms can pivot until engaging a stopping surface 132 that is disposed further from targa top 14 and the vehicle's front 126 than are lower ends 50 of the arms (FIG. 9B). Stopping surface 132 can be defined by, for example, a portion of vehicle 122's rear 130 and/or a portion of mounting frame 58. Additionally, after second linkage 38*b*' s arms 42 engage stopping surface 132, pivoting first linkage 38*a*'s arms toward the retracted position can cause the arms of third linkage 38*c* to pivot relative to the second linkage (FIG. 9C), thereby causing retractable top 18's fabric 30 to fold. First linkage 38*a* can continue to pivot until it engages third linkage 38*c* such that retractable top 18 is in the retracted position (FIG. 9D). Arms 42 of first linkage 38*a* can be pivoted in any suitable manner, such as via a motor 168 for at least one—optionally for each—of the arms that can be configured to pivot the arm relative to vehicle 122 to cause retractable top 18 to move between the deployed and retracted positions.

Figure 10:
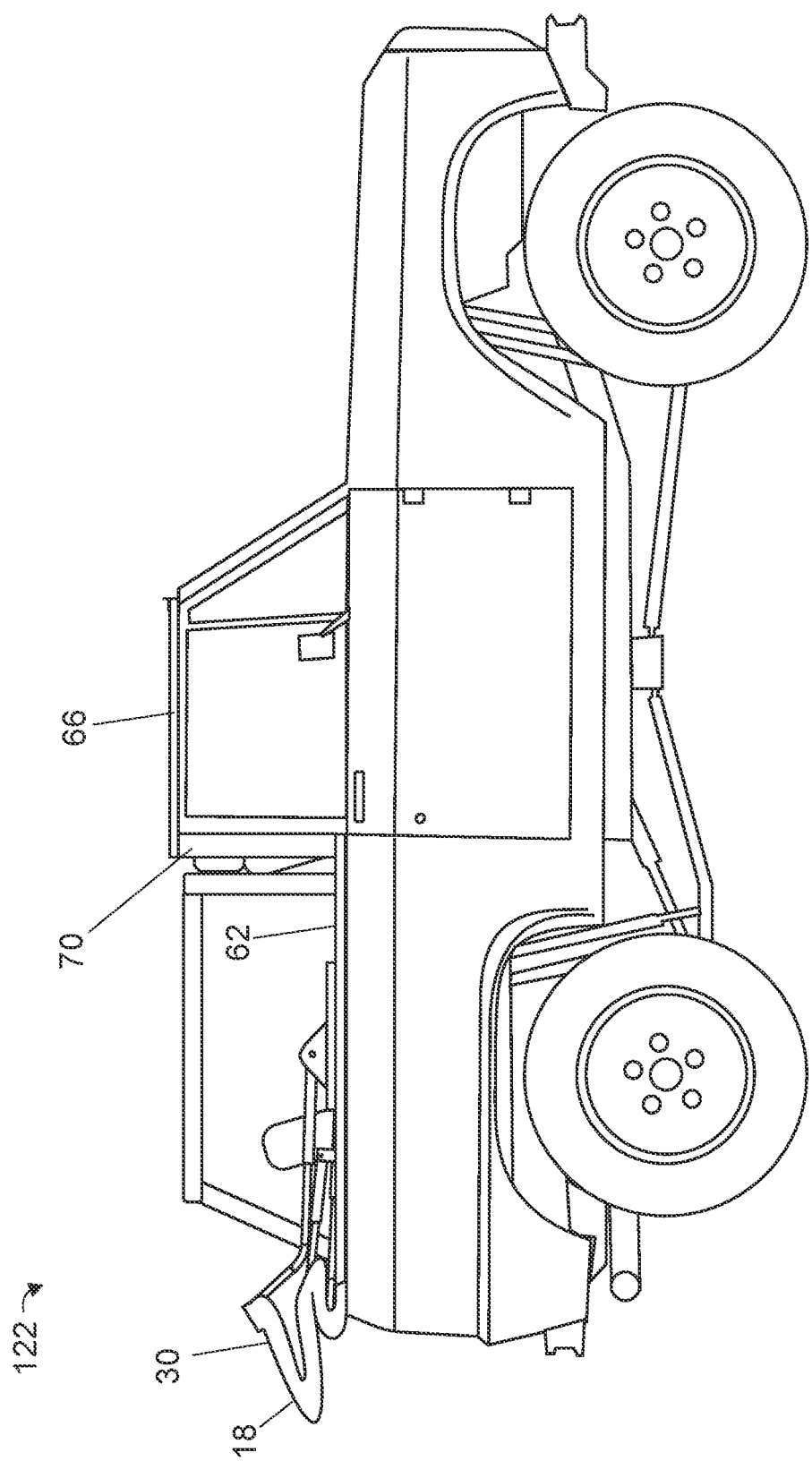
FIG. 10 is a side view of the vehicle of FIG. 2A when the retractable top is in the retracted position and the targa top is removed.

As shown in FIG. 10, to fully expose vehicle 122's passenger compartment, targa top 14 can be removed and retractable top 18 can be pivoted to its retracted position. However, as mentioned above, targa top 14 can be removed independently of the pivoting of retractable top 18, and the retractable top and be pivoted between the deployed and retracted positions independently of the removal of the targa top. Targa top 14 can thus be removed without retracting retractable top 18 to expose only the front portion of the passenger compartment (FIG. 3) and/or the retractable top can be pivoted to the retracted position without removing the targa top to expose only the rear portion of the passenger compartment (FIG. 9D).

A vehicle 122 that can include vehicle top 10 can be any suitable vehicle, such as an automobile. As shown vehicle 122 can be a sport utility vehicle, which can be relatively large. To illustrate, vehicle 122's height can be greater than or equal to any one of, or between any two of, 67, 69, 71, 73, 75, or 77 inches (e.g., at least 69 inches) and length can be greater than or equal to any one of, or between any two of, 145, 148, 151, 154, 157, 160, 163, 166, 169, or 172 inches.

Such a sport utility vehicle 122 can also be four-wheel or all-wheel drive such that each of its four wheels can be configured to receive power from its engine. In other embodiments, however, vehicle 122 can be a different type of vehicle, such as a side-by-side, buggy, and/or the like.

Some of the present methods of retracting a vehicle top (e.g., 10) (e.g., any of those described above)—which can comprise a retractable top (e.g., 18) comprising a fabric (e.g., 30) and a frame (e.g., 34)—include a step of pivoting the retractable top from the deployed position (FIG. 9A) to the retracted position (FIG. 9D), the fabric disposed closer to a front (e.g., 126) of a vehicle (e.g., 122) and overlying more of the vehicle when the retractable top is in the deployed position than when it is in the retracted position as described above.

In some methods, two side panels (e.g., 22a and 22b) each extends between the retractable top and a respective one of opposing sides (e.g., 134a and 134b) of the vehicle and a rear panel (e.g., 26) extends between the retractable top and a rear (e.g., 130) of the vehicle. Before the retractable top is pivoted to the retracted position, some methods comprise decoupling the side panels and the rear panel from the vehicle and the retractable top, such as by sliding the side and rear panels relative to the retractable top as described above. To facilitate removal of the rear panel, the retractable top can be pivoted toward the retracted position (e.g., to a position between the deployed and retracted positions). This can relieve tension on the rear panel such that that a bottom portion (e.g., 154) thereof can be readily disengaged from the vehicle's rear to permit the rear panel to slide relative to the retractable top.

As described above, the retractable top's frame can comprise two or more linkages (e.g., 38a-38c) that each includes two arms (e.g., 46), each having an upper portion (e.g., 46) that is coupled to the retractable top's fabric and is disposed closer to the vehicle's front when the retractable top is in the deployed position than when the retractable top is in the retracted position. In some methods, pivoting the retractable top to the retracted position comprises pivoting the arms of the first (e.g., 38a) and second (e.g., 38b) linkages relative to the vehicle. Pivoting the retractable top can comprise actuating one or more motors (e.g., 168) such that the motor(s) pivot the arms of the first linkage relative to the vehicle, thereby causing the arms of the second linkage to pivot until they engage a stopping surface (e.g., 132) disposed further from the vehicle's front than the lower ends (e.g., 50) of the arms of the second linkage and, after the second linkage's arms engage the stopping surface, the arms of a third linkage (e.g., 38c) to pivot relative to the second linkage.

Some methods include a step of removing a targa top (e.g., 14) that overlies at least one—optionally at least two—front seat (e.g., 136a) of the vehicle from the vehicle (e.g., in any of the manners described above). The targa top can be removed before, during, or after the retractable top is pivoted to the retracted position.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A vehicle top comprising:
   a front top; and
   a retractable top comprising fabric and a frame, wherein the frame includes two or more linkages, each of the linkages comprising two arms that each have an upper portion that is coupled to the fabric of the retractable top;
   wherein the front top and the retractable top are configured to be coupled to a vehicle such that:
   the front top overlies at least one front seat of the vehicle; and
   the retractable top is pivotable between deployed and retracted positions, the fabric of the retractable top disposed closer to the front top and overlying more of the vehicle when the retractable top is in the deployed position than when the retractable top is in the retracted position, wherein:
   the upper portion of each of the arms of each of the linkages is disposed closer to the front top when the retractable top is in the deployed position than when the retractable top is in the retracted position;
   for each of first and second ones of the linkages, each of the arms has a lower end configured to be pivotably coupled to a respective one of opposing sides of the vehicle;
   for each of the arms of the first linkage, the upper portion of the arm is coupled to a front portion of the fabric of the retractable top such that, when the retractable top is in the deployed position, as measured along a length of the vehicle the upper portion of the arm is disposed closer to the front top than is the lower end of the arm; and
   for each of the arms of the second linkage, the upper portion of the arm is coupled to a rear portion of the fabric of the retractable top such that, when the retractable top is in the deployed position, as measured along a length of the vehicle the upper portion of the arm is disposed further from the front top than is the lower end of the arm.

2. The vehicle top of claim 1, comprising a rear panel and two side panels configured to be removably coupled to the retractable top and the vehicle when the retractable top is in the deployed position such that:
   the rear panel extends between the retractable top and a rear of the vehicle; and
   each of the side panels extends between the retractable top and a respective one of opposing sides of the vehicle.

3. The vehicle top of claim 2, wherein the rear panel and the side panels each comprise fabric surrounding a transparent material.

4. The vehicle top of claim 2, wherein the rear panel and the side panels each are configured to be slidably coupled to the retractable top.

5. The vehicle top of claim 2, wherein each of the side panels is configured to be coupled to the rear panel.

6. The vehicle top of claim 5, wherein each of the side panels comprises a fastening element in a rear portion of the side panel that is configured to engage a fastening element of the rear panel to couple the side panel to the rear panel.

7. The vehicle top of claim 1, wherein:
the two or more linkages comprise three or more linkages;
each of the arms of a third one of the linkages has a lower end pivotably coupled to a respective one of the arms of the second linkage; and
for each of the arms of the third linkage, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the front top than is the lower end of the arm.

8. The vehicle top of claim 1, wherein each of the linkages comprises a cross-support that is coupled to the fabric of the retractable top and extends between the upper portions of the arms of the linkage.

9. The vehicle top of claim 8, wherein the linkages are sized such that, when the retractable top is in the retracted position, for each of the cross-supports a distance, measured along the length of the vehicle, between the cross-support and each other of the cross-supports is within 10% of the length of the retractable top when in the deployed position.

10. The vehicle top of claim 7, comprising:
one or more motors configured to pivot the arms of the first linkage relative to the vehicle to move the retractable top between the deployed and retracted positions;
wherein the retractable top is configured such that when the retractable top is pivoted from the deployed position to the retracted position, pivoting of the arms of the first linkage causes:
the arms of the second linkage to pivot until engaging a stopping surface disposed further from the front top than are the lower ends of the arms of the second linkage; and
after the arms of the second linkage engage the stopping surface, the arms of the third linkage to pivot relative to the second linkage.

11. The vehicle top of claim 1, comprising a mounting frame that includes a front support, a linkage support, and a riser extending between the targa front support and the linkage support, wherein:
the linkage support is configured to be fastened to opposing sides of the vehicle such that the front support is disposed higher and closer to a front of the vehicle than the linkage support;
the front top is configured to be removably coupled to the front support; and
the lower ends of the arms of the first and second linkages are pivotably coupled to the linkage support.

12. The vehicle top of claim 1, wherein the front top comprises fabric and a frame coupled to the fabric, wherein the frame of the front top is configured to be removably coupled to the vehicle such that the fabric of the front top overlies at least one front seat of the vehicle.

13. The vehicle top of claim 12, wherein the front top comprises one or more latches, each configured to detachably engage the vehicle.

14. A vehicle comprising the vehicle top of claim 1, wherein:
the front top is removably coupled to the vehicle such that the front top overlies at least one front seat of the vehicle; and
the retractable top is coupled to the vehicle such that the retractable top is pivotable between the deployed and retracted positions, the fabric of the retractable top disposed closer to the front top and overlying more of the vehicle when the retractable top is in the deployed position than when the retractable top is in the retracted position, wherein for each of the first and second linkages, the lower end of each of the arms is pivotably coupled to a respective one of opposing sides of the vehicle.

15. A method of retracting a vehicle top, the method comprising:
pivoting a retractable top from a deployed position to a retracted position, wherein:
the retractable top comprises fabric and a frame that includes two or more linkages, each of the linkages comprising two arms that each have an upper portion that:
is coupled to the fabric of the retractable top; and
is disposed closer to the front of a vehicle when the retractable top is in the deployed position than when the retractable top is in the retracted position;
for each of first and second ones of the linkages, each of the arms has a lower end that is pivotably coupled to a respective one of opposing sides of the vehicle;
for each of the arms of the first linkage, the upper portion of the arm is coupled to a front portion of the fabric of the retractable top such that, when the retractable top is in the deployed position, as measured along a length of the vehicle the upper portion of the arm is disposed closer to the front of the vehicle than is the lower end of the arm;
for each of the arms of the second linkage, the upper portion of the arm is coupled to a rear portion of the fabric of the retractable top such that, when the retractable top is in the deployed position, as measured along a length of the vehicle the upper portion of the arm is disposed further from the front of the vehicle than is the lower end of the arm;
pivoting the retractable top to the retracted position comprises pivoting the arms of the first and second linkages relative to the vehicle; and
the fabric is disposed closer to a front of the vehicle and overlies more of the vehicle when the retractable top is in the deployed position than when the retractable top is in the retracted position; and
removing a front top that overlies at least one front seat of the vehicle from the vehicle.

16. The method of claim 15, wherein before the retractable top is pivoted to the retracted position:
two side panels each extend between the retractable top and a respective one of opposing sides of the vehicle;
a rear panel extends between the retractable top and a rear of the vehicle; and
the method comprises decoupling the side panels and the rear panel from the vehicle and the retractable top.

17. The method of claim 16, wherein decoupling the rear panel comprises pivoting the retractable top to a position that is between the deployed position and the retracted position.

18. The method of claim 15, wherein:
the two or more linkages comprise three or more linkages;
each of the arms of a third one of the linkages has a lower end pivotably coupled to a respective one of the arms of the second linkage;
for each of the arms of the third linkage, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the front of the vehicle than is the lower end of the arm; and pivoting the retractable top to the retracted position comprises actuating one or more motors such that the motor(s) pivot the arms of the first linkage relative to the vehicle, wherein pivoting of the arms of the first linkage causes:

the arms of the second linkage to pivot until the arms engage a stopping surface disposed further from the front of the vehicle than the lower ends of the arms of the second linkage; and after the arms of the second linkage engage the stopping surface, the arms of the third linkage to pivot relative to the second linkage.

19. The vehicle of claim 14, wherein:

the two or more linkages comprise three or more linkages;

each of the arms of a third one of the linkages has a lower end pivotably coupled to a respective one of the arms of the second linkage; and for each of the arms of the third linkage, the upper portion of the arm is coupled to a middle portion of the fabric of the retractable top that is disposed between the front and rear portions of the fabric such that, when the retractable top is in the deployed position, as measured along a length of the vehicle the upper portion of the arm is disposed closer to the front top than is the lower end of the arm.

20. The vehicle of claim 19, comprising:

one or more motors configured to pivot the arms of the first linkage relative to the vehicle to move the retractable top between the deployed and retracted positions;

wherein the retractable top is configured such that when the retractable top is pivoted from the deployed position to the retracted position, pivoting of the arms of the first linkage causes:

the arms of the second linkage to pivot until engaging a stopping surface disposed further from the front top than are the lower ends of the arms of the second linkage; and after the arms of the second linkage engage the stopping surface, the arms of the third linkage to pivot relative to the second linkage.

\* \* \* \* \*